(12) United States Patent
Ament et al.

(10) Patent No.: US 7,255,382 B2
(45) Date of Patent: Aug. 14, 2007

(54) EASY-TO-USE SAFETY NET DEVICE

(75) Inventors: Eduard Ament, Aichwald (DE); Holger Seel, Aidlingen (DE); Herbert Walter, Ebersbach (DE)

(73) Assignee: Baumeister + Ostler GmbH & Co., Aichwald (DE)

( * ) Notice: Subject to any disclaimer, the term of this patent is extended or adjusted under 35 U.S.C. 154(b) by 0 days.

(21) Appl. No.: 11/438,196

(22) Filed: May 22, 2006

(65) Prior Publication Data
US 2006/0208518 A1  Sep. 21, 2006

Related U.S. Application Data

(62) Division of application No. 10/146,077, filed on May 15, 2002, now Pat. No. 7,048,319, which is a division of application No. 09/319,425, filed as application No. PCT/DE97/02838 on Dec. 4, 1997, now Pat. No. 6,390,526.

(30) Foreign Application Priority Data

Dec. 6, 1996 (DE) .................. 196 50 768
Mar. 10, 1997 (DE) .................. 197 09 525

(51) Int. Cl.
*B60R 21/06* (2006.01)
(52) U.S. Cl. .................................................. 296/37.16
(58) Field of Classification Search ............ 296/37.16, 296/37.8, 98, 24.3, 24.4; 160/238, 296, DIG. 2, 160/DIG. 10, 24, 370.22, 315, 301, 302, 160/290.1, 303, 304.1; 280/748, 749; 248/266
See application file for complete search history.

(56) References Cited

U.S. PATENT DOCUMENTS

| 6,032,718 | A  | * | 3/2000  | Chen .................... 160/370.22 |
| 6,109,330 | A  | * | 8/2000  | Crisp .................... 160/370.22 |
| 6,189,948 | B1 | * | 2/2001  | Lin ............................ 296/97.4 |
| 6,349,986 | B1 | * | 2/2002  | Seel et al. ............... 296/37.16 |
| 6,657,616 | B2 | * | 12/2003 | Sims .......................... 345/173 |
| 6,834,705 | B2 | * | 12/2004 | Seel ....................... 160/370.22 |

* cited by examiner

*Primary Examiner*—Hilary Gutman
(74) *Attorney, Agent, or Firm*—Leydig, Voit & Mayer, Ltd.

(57) ABSTRACT

The invention relates to a safety net device with a housing, in which a winding shaft is rotationally mounted. The winding shaft is pretensioned by a spring motor in the direction of winding of a safety net which is fixed to the winding shaft. The other edge of the safety net which is fixed to the winding shaft. The other edge of the safety net is connected to a pull bar which is suspended in the recesses in the car body. In order to minimize the effort required by the user to suspend said device, a holding device absorbs at least part of the pull-back force when the safety net is wound back into the housing immediately after the safety net has been pulled out of the housing to enable the pull bar to be suspended in the recesses. The holding device can be released at will in order to roll up the safety net back into the housing.

7 Claims, 15 Drawing Sheets

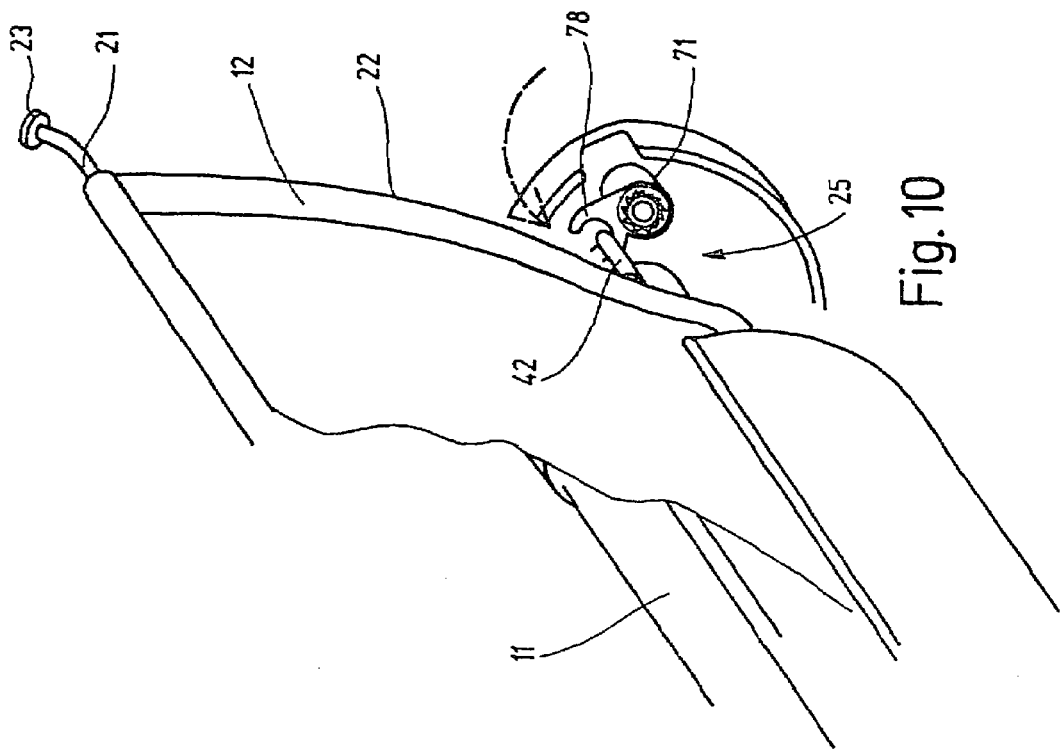
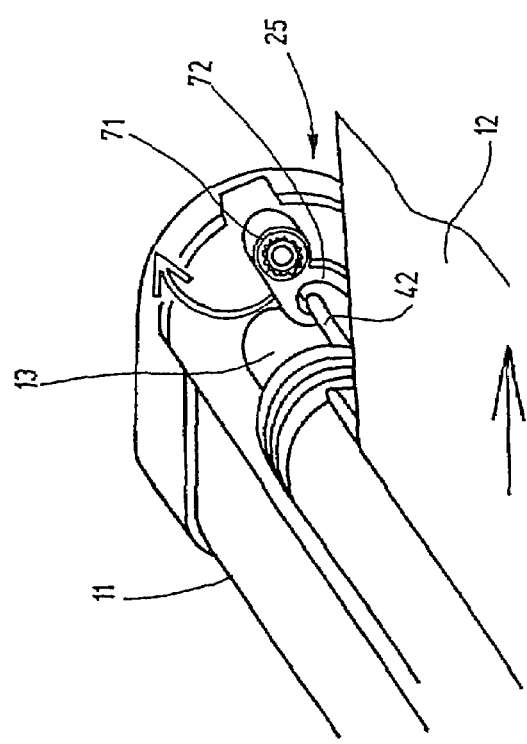
Fig. 10
Fig. 9

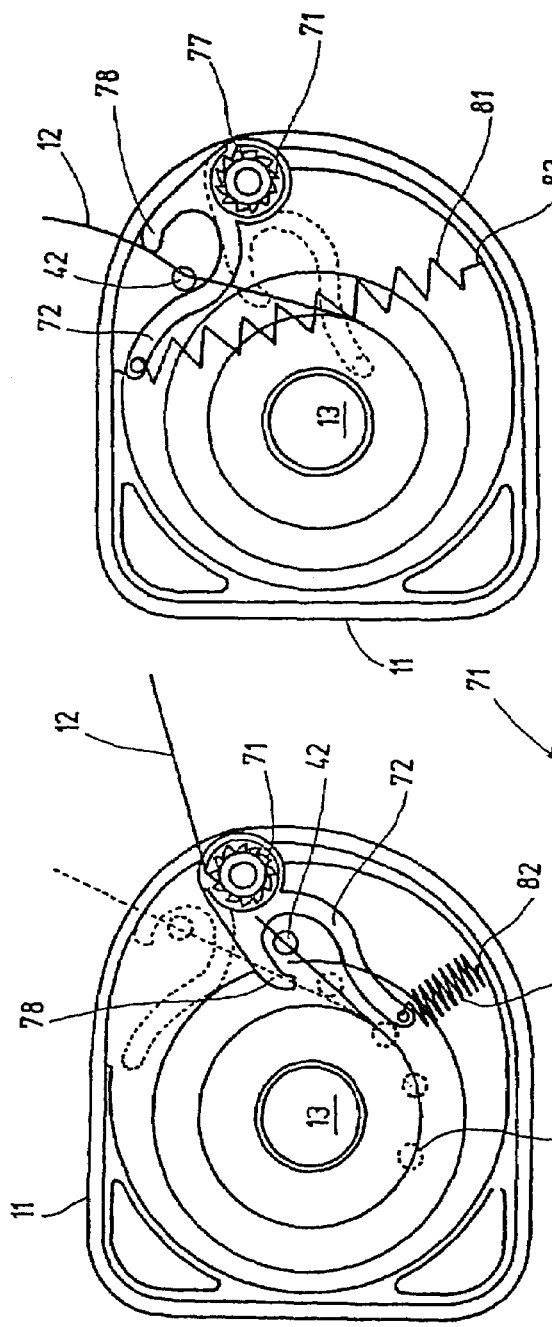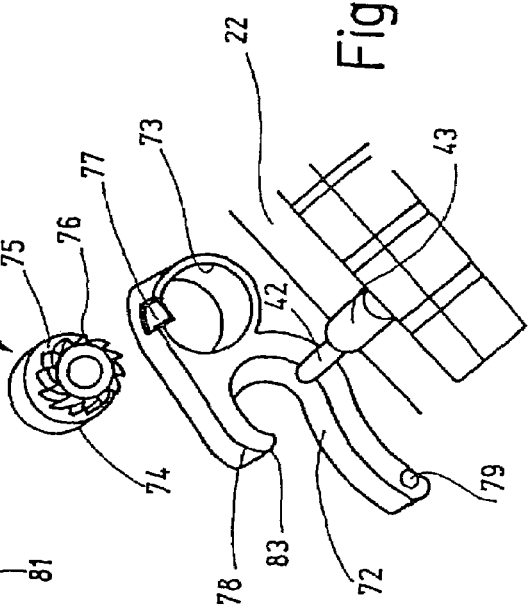
Fig. 11
Fig. 12
Fig. 13

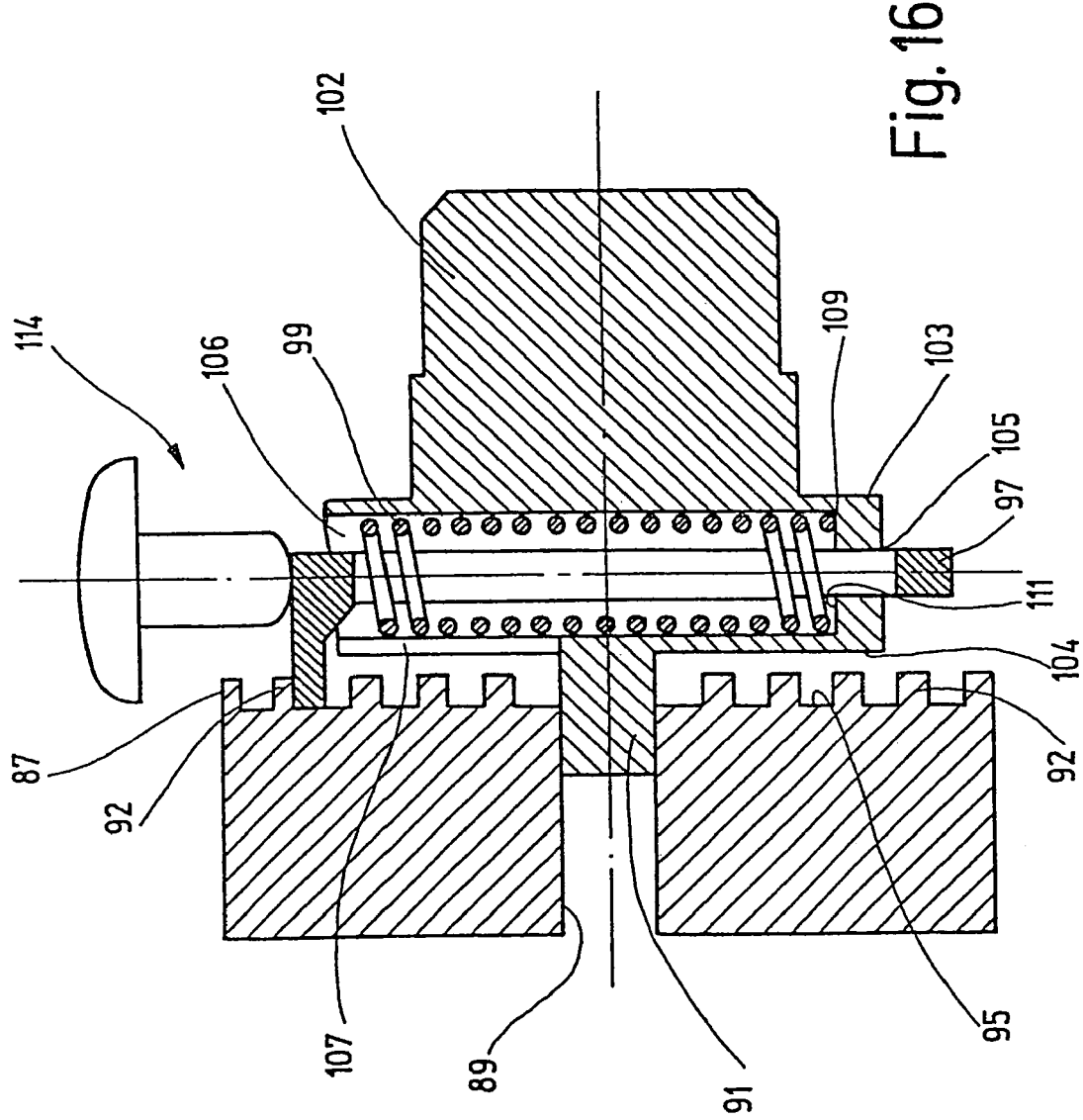

EASY-TO-USE SAFETY NET DEVICE

RELATED APPLICATIONS

This patent application is a divisional application of co-pending U.S. patent application Ser. No. 10/146,077, filed May 15, 2002, now U.S. Pat. No. 7,048,319 which is a divisional of U.S. patent application Ser. No. 09/319,425, filed Aug. 2, 1999 (U.S. Pat. No. 6,390,526) which is a 371 of PCT/DE97/02838, filed Dec. 4, 1997.

FIELD OF THE INVENTION

The present invention relates to safety devices for automobiles, and more particularly to an improved safety net device for sealing off the luggage compartment or truck of an automobile from the passenger compartment.

BACKGROUND OF THE INVENTION

Safety net devices function for the purpose of mechanically sealing off the luggage compartment or trunk from the passenger compartment in station wagons or similar automobiles. They should prevent objects from being thrown from the luggage compartment into the passenger compartment in case of a rear-end collision or crash, where they would injure or kill the passengers. For this purpose, the opening which is below the inside roof lining and is remaining, for example, above the edge of the rear seat back rest is closed with the safety net when such a danger potentially exists.

If on the other hand, an endangering of the passengers can be ruled out with certainty because the loading height in the luggage compartment does not exceed the height of the rear seat edge, and also because objects sliding together can not pile up in such a way during a rear-end collision that they climb over the rear seat back rest, the safety net does not need to be used. On the contrary, it then becomes rather disruptive.

For this reason, the safety net is frequently constructed in the manner of a self-erecting window shade.

The patent EP-A-0 649 778 shows a safety net device of this type. The known safety net device has a housing, in which a winding shaft is set in bearings so that it can rotate. Onto the winding shaft, a safety net is attached with one edge and its other edge is provided with a pull bar. The pull bar carries anchorage components, which can be suspended in the corresponding receptacle bays in the car body.

The spring drive, which pretensions the winding shaft in the wind-up direction, is relatively powerful, in order to hold the safety net sufficiently tautly tensioned when it is reeled-out. The spring motor, however, is not so strong that it could retain the objects that are thrown against the safety net, during a crash or a strong braking operation.

In order to be able to deploy the safety net in the known arrangement, the pull bar must first be pulled sufficiently far out of the housing against the action of the winding spring. Only then can the anchorage components be suspended in the receptacle bays.

On account of the strength of the spring motor, a considerable force is necessary for this and on top of that, the receptacle bays are difficult for a service person standing in front of the luggage compartment opening of the vehicle to see because of the vehicle geometry. For the service person, it is therefore not easy to suspend the anchorage components in the receptacle bays, especially taking into account the somewhat unfavorable bodily posture with outstretched arms, which is necessary for this operation.

OBJECTS AND SUMMARY OF THE INVENTION

In view of the foregoing, an object of the invention is to create a safety net device which is easier to handle when it is suspended in the receptacle bays on the car body.

The present invention provides these and other advantages and overcomes the drawbacks of the prior art by providing a safety net device having a retaining device which allows the net to be unwound with as little effort as possible.

The retaining device provides that at least a portion of the pull-back force that occurs through the drive device for the winding shaft or its spring motor, is reduced. The user thus only has to apply a small supplemental force on the pull bar. This smaller force can also be readily produced with outstretched arms.

Moreover, the retaining device has the great advantage that it signals to the user when a sufficient quantity of safety net has been unwound, so that the pull bar can be guided into the receptacle bays in the car body. This is especially significant for safety nets that are to be used variably, in the sense that the housing is located in the one usage position at the level of the upper edge of the rear seat back rest. In the other usage position, the housing is located near the floor of the luggage compartment, so that a corresponding supply of safety net must be wound up onto the winding shaft. The retaining device makes it simpler for the user to find the corresponding intermediate position.

In a corresponding manner, at least one pull-out position defines a partial pull-out length, in which the safety net is only withdrawn by a portion of its total possible pull-out length. If the safety net is constructed only for one pull-out length, it is also possible to define the pull-out position such that it almost completely corresponds to the total possible pull-out length.

The handling is especially favorable when the retaining device is constructed in such a manner that it completely absorbs the pull-back force. A retaining device of this type is preferably provided so that it has two states, namely a first one in which it absorbs the pull-back force, and a second one in which it does not absorb the pull-back force, so that the safety net can be wound up again around the winding shaft.

In the case of a complete absorption of the pull-back force by the retaining device, a triggering device is allocated to the retaining device and is set up in order to transfer the retaining device from the first state into the second state.

This triggering device can be made from a timing element so that a manual activation is unnecessary. It can, however, also be planned for manual activation. This embodiment form is constructively the simplest; however, it has as a prerequisite a combined action of the user.

The retaining device can also be designed in such a manner that it at least signals to the user that the safety net has been pulled out far enough to suspend the pull bar.

For the embodiment of the retaining device, three different basic designs come into consideration. In the one basic design, the retaining device operates together with the pull bar, in the second embodiment form, together with the winding shaft and in a third embodiment form, it can act together with a bar that is affixed to the safety net.

Regardless of how the retaining device is constructed in detail, it can have catch mechanisms that act together in a non-positive manner and can be overcome, which are constructed so that they do not prevent a further pull-out of the safety net over that pull-out length in which the safety net is pulled out far enough so that the pull bar can be suspended in the receptacle bays. These catch mechanisms likewise readily absorb a portion of the pull-back force and thus make handling easier during suspension of the pull bar.

The retaining device can also have capture mechanisms that act together in a positive-locking manner, which are constructed so that they block a further pull out of the safety net over that pull out length in which the safety net is pulled out far enough so that the pull bar can be suspended in the receptacle bays.

Catch mechanisms that act together in a non-positive manner and can be overcome can, for example, be in a groove connected to the housing, which is open on the end side and in which a pull bar that is mounted on the net can be caught.

In order to create the retaining device mentioned above, which acts together with the winding shaft, a pivotable locking component can be used as a stationary retaining mechanism. This locking component is set in bearings in the housing next to the winding shaft and carries a catch that acts together with the bar affixed to the safety net. The locking component has two operating positions, where in the one position it blocks a return movement of the safety net, whereas in the other position, the bar can pass freely.

A device of this type is to be dismounted both by hand as well as automatically, and to be precise, for example, using a timing element. This timing element consists in the simplest case of a viscosity brake. So that the timing element is not effective when the locking component is brought into the locking position, it is coupled via a free-wheel to the viscosity brake. The viscosity brake only allows the locking component to slide back in a comparatively slow manner into the release position under the influence of force, so that during the total delay time, the pull-back force is absorbed by the viscosity brake.

In the case of the retaining device acting together with the pull bar, at least one spacer component is provided in the simplest case, which is affixed to the housing at one end and at the other end is connected to the pull bar. In the process, the mechanical ratios are very simple if the spacer component has a fixed, non-variable length.

In order to obtain the desired comfortable handling, the spacer component is connected to the housing in such a way that it prevents the movement of the pull bar away from the housing in the direction towards the luggage compartment opening, just as it prevents the suspension of the pull bar in the receptacle bays. This is achieved when the spacer component on the housing is coupled to an articulated device, which has two axles running at right angles to each other.

The pull bar can be provided with a slide guide for the end of the spacer component that is set off at a distance from the housing.

A catch device provided on the pull bar allows that in one state, the relevant end of the spacer component can pass freely, whereas on the other hand, in the other operating position, the spacer component can slide through in only one direction. In this way, a supporting effect occurs which is effective between the housing and the pull bar, since the pivoting of the spacer component is prevented by the catch device.

These and other features and advantages of the invention will be more readily apparent upon reading the following description of preferred exemplary embodiments of the invention and upon reference to the drawings wherein:

BRIEF DESCRIPTION OF THE DRAWINGS

FIG. 9 is a perspective break-away view showing an embodiment of a retaining device with a timing element, FIG. 10 shows the arrangement according to FIG. 8 in a similar diagram, however, of another operating position, FIG. 11 is a cross-sectional view showing the housing of the safety net device according to FIG. 9, depicted in the resting position, FIG. 12 shows the device according to FIG. 11 in the locking position, FIG. 13 is a perspective view showing the locking component and the time function element, FIG. 16 is a schematic longitudinal section view showing the end of the winding shaft provided with the follower, together with the spiral groove.

While the invention will be described and disclosed in connection with certain preferred embodiments and procedures, it is not intended to limit the invention to those embodiments. Rather it is intended to cover all such alternative embodiments and modifications as fall within the spirit and scope of the invention.

DETAILED DESCRIPTION OF THE INVENTION

Figure 1:
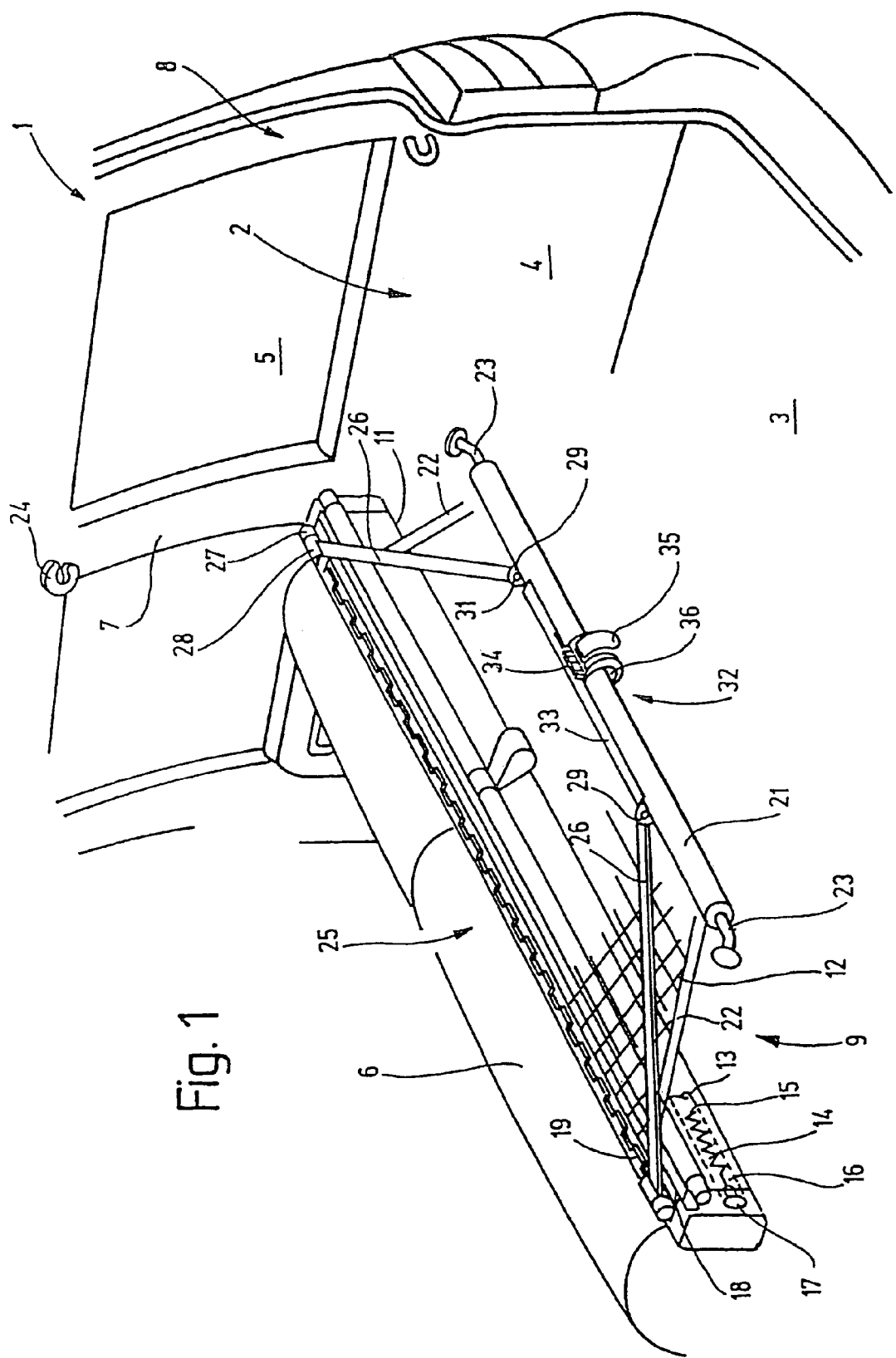
FIG. 1 is a perspective view of a safety net device according to the invention, as it is attached to the rear side of a rear seat back rest, with the safety net pulled out to be suspended below the inside roof lining.

In FIG. 1, the rear part 1, depicted in break-away, of a station wagon or automobile is shown in perspective view, where its luggage compartment 2 is defined by a floor 3 as well as two side walls, of which only the right side wall 4 is shown. Above the side wall 4, a rear side window 5 is located, while the front edge of the luggage compartment 2 forms a rear seat back rest 6 of a rear seat bench. The side window 5 ends at the front on a C-column 7, which is located approximately at the height of the rear seat back rest 6 and at the rear end in the area of a luggage compartment opening 8, of which only a side edge is shown.

As can be recognized in the Figure, there is an opening between the inside roof lining, which can not be recognized in the Figure, and the upper edge of the rear seat back rest 6, by which the luggage compartment 2 is connected to the passenger compartment, which is located in front of the rear seat back rest 6. So that in a rear-end collision, no objects from the luggage compartment 2 are thrown into the passenger compartment, a safety net device 9 is provided. This safety net device 9 has a housing 11 as well as a safety net 12 to be pulled out of the housing 11.

The housing 11 is a longitudinal housing, which is detachably connected to the rear side of the rear seat back rest 6 and extends almost over the entire width. In the inside of the housing 11, a winding shaft 13 is located, which is set in bearings so that it can rotate on the end side in the housing 11. The length of the winding shaft 13 corresponds approximately to the length of the housing 11.

The winding shaft 13 is tube-shaped at least in an end section and contains in this section a coil spring 14, which functions as a spring motor. The coil spring 14 is connected at its internal end 15 rigidly to the winding shaft 13, while its outer-lying end 16 is connected rigidly so that it cannot rotate to a bearing journal 17 for the winding shaft 13, which is affixed to the housing.

On the winding shaft 13, the safety net 12 is attached by a crosswise edge, which leads out through an outlet slit 18 from the housing 11, which is limited by two lips 19, 20 that are parallel to each other. A lip of the outlet slit 18, namely the lip 19, is toothed, in order to catch the safety net 12 in a crash in the manner described later. The lip 19 is adjacent to the passenger space.

The safety net 12 has an edge that faces away from the winding shaft 13 and is affixed to a pull bar 21. Lateral edges of the safety net 12 are bordered with bands 22.

The pull bar 21 is a profile tube with a weather-stripping groove for attachment of the relevant edge of the safety net 12. In its ends, the pull bar 21 contains mushroom-shaped anchor elements 23, which are provided for suspending in receptacle bays 24 in the car body.

The spring motor 14 attempts to pull the safety net 12 into the housing 11 with a relatively large force. The force is so large that the suspension of the anchor elements 23 can be difficult. In order to prevent the running back of the safety net 12 into the housing 11 during the suspension of the anchor elements 23, a retaining device 25 is provided.

The retaining device 25 includes two stanchions 26, each of which is hinged at one end of the housing 11. In the following, the exact description for one of the two stanchions 26 is given. This description applies logically and spatially as a mirror image also for the respective other of the two stanchions 26.

In order to affix the right stanchion 26 to the right side of the housing 11, a bearing block 27 is attached on the upper side of the housing. The bearing block 27 is located next to the outlet slit 18 on the side of the toothed lip 19. In it, a hinged bearing 28 is set so that it can be rotated around an axle. The pivot axle of the hinged bearing 28 lies parallel to the longitudinal axis of the winding shaft 13. On the hinged bearing 28, the housing-side end of the stanchion 26 is coupled, and to be precise, the stanchion 26 can be rotated in the hinged bearing 28 around an axle that runs at a right angle to the axle around which the hinged bearing 28 itself can turn.

The end of the stanchion 26 that lies away from the housing 11 is pivotally connected, to a carriage 29 that can be conducted to slide in a guide groove, not shown, in the pull bar 21. The connection between the stanchion 26 and the carriage 29 occurs, for example, via a loosely sitting rivet 31, which allows the desired hinge movement of the stanchion 26.

The guide groove, which receives the carriage 29, extends over the entire length of the pull bar 21.

On the pull bar 21, a catch device 32 is provided, which contains a cover 33. This cover 33 is provided for the purpose of covering the groove in which the two carriages 29 run, and it is connected to a hinge 34 so that it is movable with the pull bar 21. Using a spring that is not shown, the cover 33 is pretensioned in a position in which it projects in the movement path of the two carriages 29 in the guide groove. In order to lift the cover 33 out of this position, an activating clip 35 is present which is rigidly connected to the cover 33. Between the activating clip 35 and the pull bar 21, a handle ring 36 is located, which is attached to the pull bar 21.

The handling of the depicted safety net device 9 is as follows, where it is assumed that the safety net 12 is first located in the wound up position in the housing 11.

In this position, the two stanchions 26 are parallel to the pull bar 21 and their carriages 29 are opposite each other a short distance apart. The cover 33 is lifted and lies on the respective parts of the carriages 29, which project out from the corresponding guide groove.

The force of the spring motor 14 causes the pull bar 21 to lie tightly on the outlet slit 18.

When the user wants to deploy the safety net 12, he grasps the pull bar 21 from out of the luggage compartment opening 8 on the handle ring 36 and pulls the pull bar 21 to himself in the direction towards the luggage compartment opening 8. During this movement, the safety net 12 is pulled out against the action of the spring motor 14 over the smooth lips 20 of the outlet slit 18, as is shown in FIG. 1. The movement of the pull bar 21 away from the housing 11 pivots the stanchions 26 out of the position parallel to the pull bar 31 into a position that is at an angle to it, where the carriages 29 move, at the same time, away from the vicinity of the center of the pull bar 31 in the direction towards the respective adjacent end. The pivot movements are accommodated in the hinge 31 and the hinge bearing 28.

As soon as the length of the safety net 12 is pulled out of the housing 11, as is necessary so that the anchor elements 23 can be suspended in the receptacle bays 24, the two carriages 29 come into an area of their guide slit which is no longer covered by the cover 33. The cover 33 is, starting from this position of the carriage 29, no longer kept away from the pull bar 21, instead it can be pushed against the pull bar 21 under the action of its pretensioning spring. In this pushed position, it is located in the clearance space of the sliding path of the two carriages 29.

When the user pulls the safety net 12 out of the housing 11 beyond this point and then lets the pull bar 21 go, the spring motor 14 can then pull the safety net 12 only far enough back into the housing 11, until the two carriages 29 hit against the ends of the cover 33 that are set in the longitudinal direction of the pull bar 21. Further movement of the carriages 29 is prevented by the cover 33. The carriages 29 are held apart from each other at a defined distance by the cover 33. This distance defines the angle which the stanchions 26 enclose together and thus also the distance of the pull bar 21 from the housing 11.

The pull bar 21 is then rigidly supported via the two stanchions 26 opposite the housing 1. The two stanchions 26 run at a slant angle and form a trapezoid, which is stable in shape and has equal legs, together with the corresponding section of the pull bar 21 and the corresponding section of the housing 11. This is, so to speak, a frame for the safety net.

Figure 2:
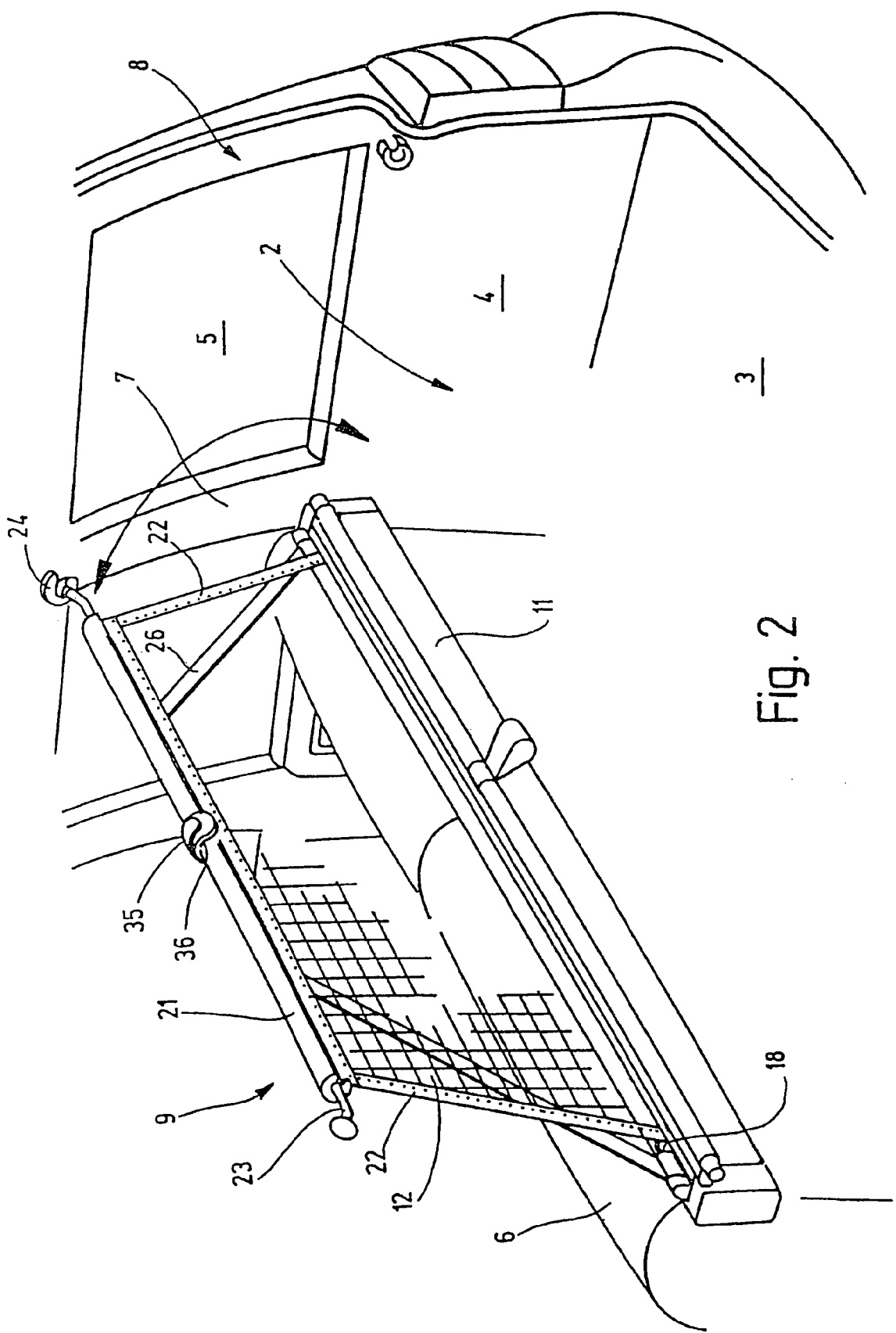
FIG. 2 is a perspective view showing the safety net device according to FIG. 1, in a suspended position.
Figure 3:
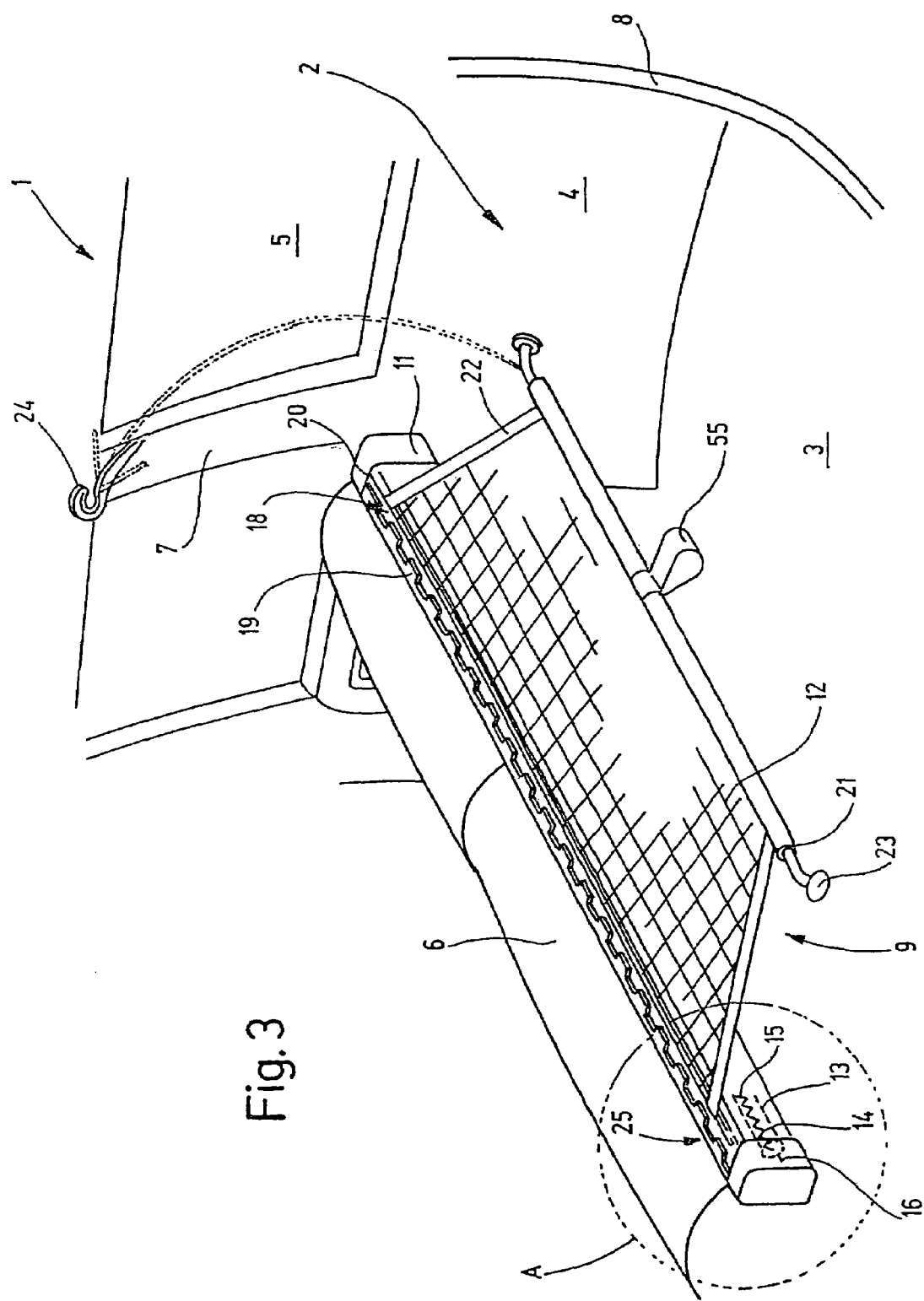
FIG. 3 shows another embodiment for a safety net device, as it is affixed on the rear side of a rear seat back rest, with a safety net partially pulled out in the direction towards the luggage compartment opening, in a perspective diagram.
Figure 4:
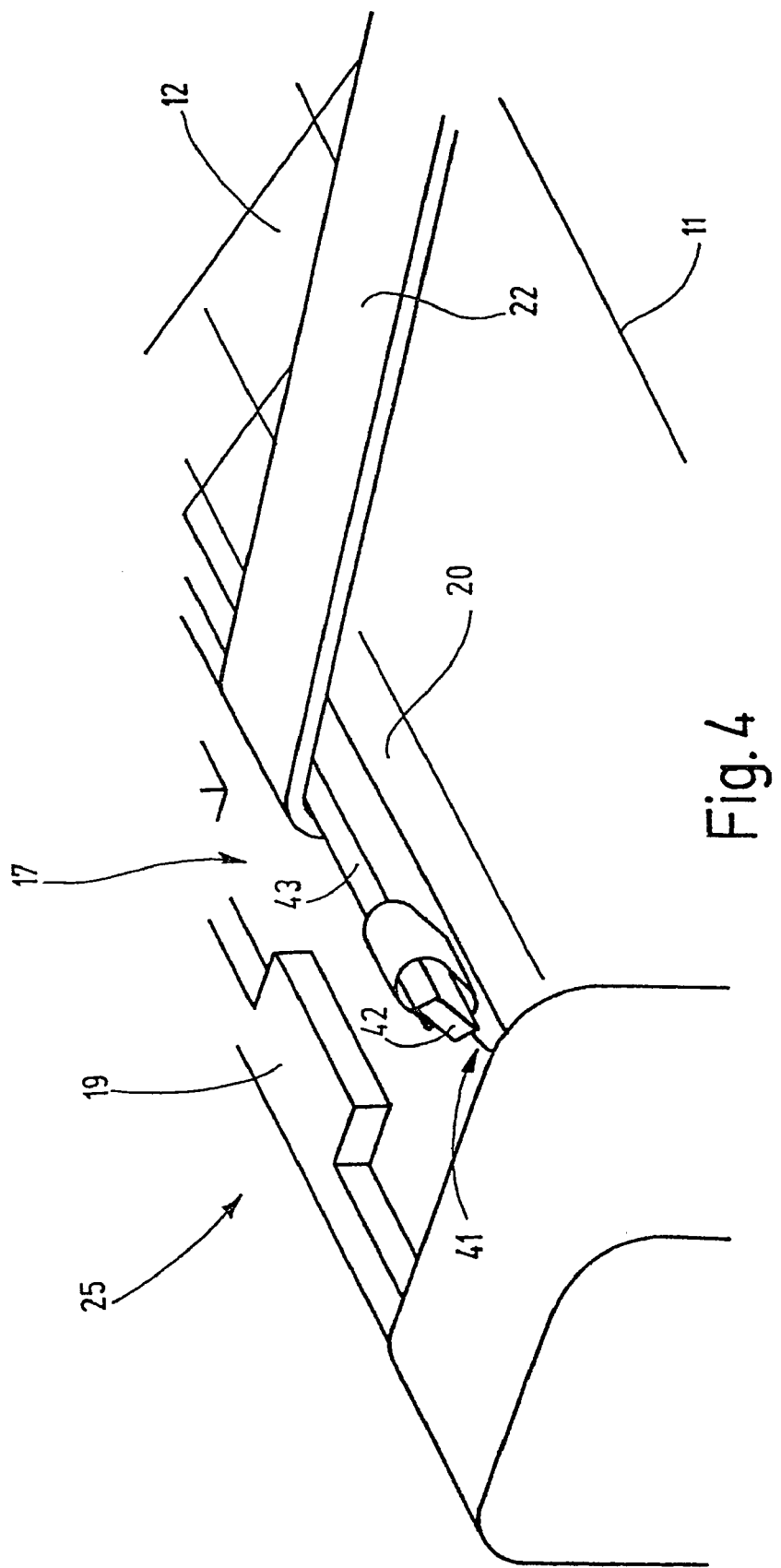
FIG. 4 shows the detail in A from FIG. 3 in an enlarged perspective diagram.

The user can then without additional force exertion, guide the pull bar 21 to the top from the position according to FIG. 1, where it performs a circle movement around the axles of the hinge bearings 28. At the end of the swing-up movement, the anchorage components 23, as is recognized in FIG. 2, slide into the receptacle bays 24. The opening above the rear seat back rest 6 is closed by the safety net 12.

The safety net 12, which is itself elastic and flexible, and which in addition, is under pretension by the spring motor 14, can be swung to the top, just like a completely rigid formed body. The stanchions 26 and the pull bar 21 form a rigid frame for the safety net 21 during handling.

The catching of the anchor elements 23 in the receptacle bays 24 is simplified even further when the receptacle bays 24 are provided with a type of lead-in funnel that provides for an additional short piece of the safety net 12 to then be pulled out of the housing 11 during the catching movement.

As is apparent, the user does not need to constantly apply an opposing force against the pull-back force of the spring motor 14 when guiding up the pull bar 21 into the receptacle bays 24. The introduction of the anchor elements 23 into the receptacle bays 24 is done almost free of forces. The user must not, as is otherwise customary, lift up the pull bar 21 with extended arms against the action of the spring motor 14.

The retraction of the safety net 12 occurs as is logical in the reverse manner, in which at first the anchor elements 23 are pulled out of the receptacle bays 24; where for this purpose, overcoming the catching force is sufficient. Then, the pull bar 21 is moved to the bottom, such that the movement is in turn guided by the stanchions 26. At the end of the movement, the stanchions 26 are set down on the upper side of the housing 11. The user can now grasp with a finger through the grip ring 36 and press down the clip 35 with his thumb. In this way, he lifts the cover 33 out of the clearance space of the carriages 29, which can now move freely towards each other. This makes it possible for the pull bar 21 to be guided onto the housing 11, where at the same time, the spring motor 14 winds up the safety net 12. The end position is achieved when the pull bar 21 is set down on the outlet slit 18. In this position, the stanchions 26 again run parallel to the pull bar 21 and to the winding shaft 13.

If a crash should occur when the safety net 12 is deployed and objects fly out of the luggage compartment 3 into the safety net 12, an additional pulling off of the safety net from the winding shaft 13 is prevented through the toothed lip 19. Its teeth grip into the meshes of the safety net 12 and block a pull-off movement.

In the FIGS. 3 to 7, an embodiment is shown, in which the retaining device 25 acts together with the safety net 12. If structural components and other components reoccur in the figures, which have already been explained in relation to the FIGS. 1 and 2, they will not be described again.

In order to simplify the operation of the new safety net device 9, two mirror-image retaining devices 25 are provided on both sides of the safety net 12. The structure of the retaining devices 25 is better seen from FIG. 4, which shows an enlarged section of the area framed by the dash-dot circle A. Since the retaining devices 25 are equivalent on both sides of the safety net 12 as mentioned, the explanation of the retaining device 25 that faces the observer will be sufficient.

The retaining device 25 is a retaining device that is positive locking and has two catch mechanisms 41 and 42 that act together with one another, of which one is attached to the lip 20 as a stationary retaining mechanism 41 and the other is attached to the safety net 12 as a movable retaining mechanism 42.

The catch mechanisms 42 attached to the safety net 12 are the ends of a rod or stanchion 43 that is essentially rectangular in cross-section and stable in shape.

The stanchion 43 is attached to the side of the safety net 12 that faces the luggage compartment opening 8 and runs over the entire width of the safety net 12. On both side edges which are formed from the bordering bands 22, the stanchion 43 overhangs by a corresponding piece extending further out so that, as mentioned, its ends 42 can form the catch mechanism connected to the safety net 12. It runs parallel to and at a distance from the pull bar 21; the exact distance can be gathered from the functional description.

Figure 5:
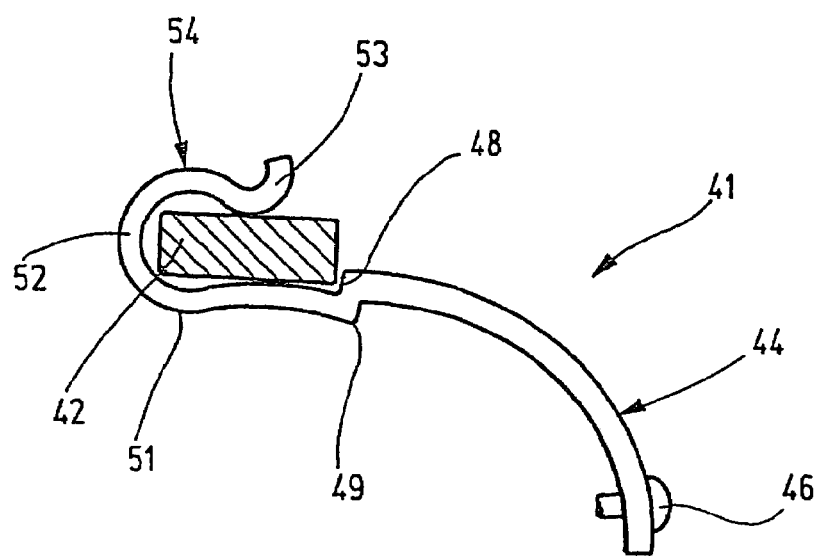
FIGS. 5 and 6 are enlarged schematic views showing the catch mechanism on one side of the safety net according to FIG. 3
Figure 6:
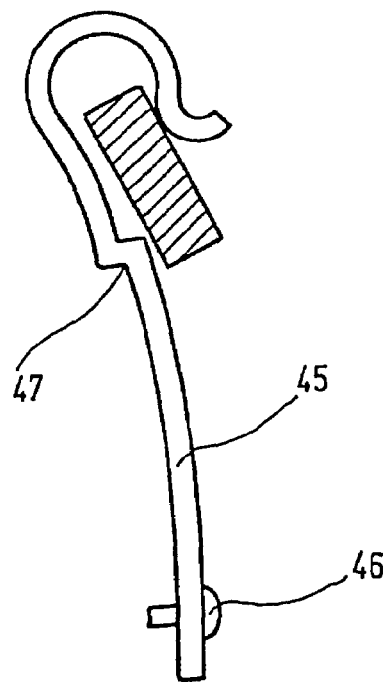

The other catch mechanism 41 is locationally fixed and consists of a spring steel band 44, which, as is shown in FIGS. 5 and 6, is bent. The spring steel band 44 forms an essentially straight or only slightly bent strut 45 in the state free of force, as is seen in FIG. 5, which on its lower end, for example using a rivet 46, is riveted fixed on the inside of the housing 11 to the lip 20. The lip 20 is not shown in FIGS. 5 and 6.

On the end that faces away from the attached end, the spring band 44 at 47 is angled in the direction away from the slit 18, so that a step 48 results. At 49, the spring band 44 is again bent around in the direction parallel to the strut 45, and to be precise, at such a distance that the step 48 resulting from this is smaller than that corresponding to the thickness of the stanchion 43.

Starting from the bending position 49, the spring band 44 essentially runs straight to a position 51 and there changes in a 180° arc 52, at the open end of which the spring band 44 is bent to the outside while forming an entry slope 53 in an S-shape. In this way, a hook 54 results, that has a clearance width that is sufficient to receive the catch mechanism 42, i.e. the projecting end of the stanchion 43.

When it is in the installed position, the strut 45 goes through the slit 18 to the inside, while the hook 54 projects as shown out of the slit 18. The hook 54 is to open in the direction to the winding shaft 13 and its hook opening is located on that side of the strut 45, which faces the lip 19, such that the function described in the following can occur.

The functional method of the safety net device described thus far is as follows:

In the resting condition, the safety net 12 is completely wound up on the winding shaft 13. The loop of the safety net 12 with the pull bar 21 contained in it lies on the outside on the two lips 19 and 20 of the outlet slit 18.

When the user wants to suspend the safety net 12 in the receptacle bays 24 above the C-columns when the back rest 6 is erected as it is shown in FIG. 1, he pulls the safety net 12 in the direction towards the luggage compartment opening 8 out of the housing 11 using an activation loop 55 that is attached to the safety net 12. In this process, the safety net 12 unwinds from the winding shaft 13 opposite the effective direction of the spring motor 14.

During the pulling off or pulling out of the safety net 12, it slides over the smooth lip 20 and moves essentially in a horizontal plane. In the process of this movement out, at some time corresponding to the distance of the pull bar 21 from the stanchion 43, the stanchion 43 is pulled out of the slit 18. During this movement directed to the outside, the projecting ends 42 with the strut 45 of the locationally fixed catch mechanism 41 come into engagement and bend the strut 45 spring-elastically, as FIG. 5 shows, around the lip 20. During the additional movement, the projecting ends 42 get into the hook 54, where they are reliably guided by the inlet slopes 53 into the hook 54.

As soon as the catch mechanisms 42 that can be moved with the safety net 12, in the form of the projecting ends of the stanchion 43, have hooked into the two locationally fixed hooks 54, no additional pull-out movement of the safety net 12 is possible. The user feels a correspondingly clear resistance and he is signaled through the retaining device 25 that has now become effective, that the exact quantity of safety net 12 has been pulled out which is sufficient to suspend the anchorage mechanisms 23 in the receptacle bays 24. The user can now, without observing the suspension operation, using the loop 55, blindly guide the next adjacent edge of the safety net 12 with the pull bar 21 to the top, where the safety net 12 will perform a pivot movement around the stanchion 43, or when the movable strut 45 of the locationally fixed catch mechanism 41 is added, around the rivet 46. The safety net 12 functions as the spacer and provides that inevitably the anchor elements 23 get into the receptacle bays 24.

During this movement pivoting up, the struts 45 become oriented from the position, as is shown in FIG. 5, again into the position according to FIG. 6. Since, furthermore, the distance of the receptacle bays 24 from the housing 11 is somewhat shorter than that corresponding to the quantity of safety net 12 that has been pulled out, the winding shaft 13 pulls the small excess portion of safety net 12 again back into the housing 11. This movement is a movement out of the hook 54 and is prevented by the step 48. Since, however, the step 48 is not exactly sharp-edged, but instead has a certain residual slope, it acts like a catch mechanism that releases the stanchion 26 after a corresponding force has been overcome, so that at the end of the suspending operation, a position, approximately as shown in FIG. 6, is achieved or a position, in which the stanchion 43 is released completely from the hook 54.

The purpose of the step 48 consists in absorbing a part of the pull-back force of the winding shaft 13 so that the user, when he must move the pull bar 21 to the top to the receptacle bays 24 with his arm extended, must not apply the full opposing force for the pull-back force of the safety net 12. Moreover, the retaining force is smaller than the pull-back force, so that in each case the winding shaft 13 can pull the stanchion 43 out of the hook 54 when the safety net 12 is driven in. When the safety net 12 is deployed and an object is thrown from the luggage compartment 2 into the safety net 12, it is pressed to the front under the action of this object in the direction to the toothed lip 19, such that the mesh of the safety net 12 is hung in the teeth of the toothed lip 19 and an subsequent unwinding of the safety net 12 from the winding shaft 13 is blocked.

In order to retract in the safety net 12, it is sufficient to allow the anchor elements 23 to be dismounted from the receptacle bays 24 and to allow the safety net 12 to run back.

When the rear seat back rest 6 is laid down and the housing 11 is attached to the floor, and a larger pull-out quantity is necessary, as a rule the handling can no longer readily occur from out of the luggage compartment opening 8. The housing 11 is located in proximity to the rear seat back rest of the front seat, which is why the operation must occur through the rear doors. In this type of operation, the pull-out direction of the safety net 12 is no longer, as described previously, approximately horizontal, but instead is more vertical. When the strut 45 of the catch mechanism 41 is bent somewhat from out of the housing, the hooks 54 are outside of the movement path of the stanchion 43 during the vertical movement of the safety net 12 and the stanchion will not be suspended in the hooks 54 during the vertical pull-out of the safety net 12 so that the full pull-out length is available.

Instead of a retaining device 25 that acts in a positive locking manner, which definitively defines the pull-out path, a retaining device 25 can also be used, which can be overcome when there is sufficient activation force. Such a retaining device 25 is shown in various operating positions, greatly schematized in FIGS. 7 and 8. Belonging to it, are in turn a locationally fixed catch mechanism 56 as well as a catch mechanism 42 that can be moved with the safety net 12. This catch mechanism 42 that can be moved is in turn, the laterally projecting ends of the stanchion 43, which is provided on a flat side with a catch trough or catch groove 57, which runs in the longitudinal direction of the strut 43.

Similar to the catch mechanism 41, the locationally fixed catch mechanism 56 has a flexible strut 58, the lower end of which is attached to a rivet 46 in the inside of the housing 11. On the upper end, the strut 58 is provided with a groove 59 that is opened to both sides, and which is limited by two groove walls 61 and 62 that are parallel to each other. Both groove walls 61 and 62 are connected to each other as a single piece via a back piece 63. In the assembled condition, the groove 59 is located outside of the outlet slit 18.

This configuration can be obtained, either in that a corresponding piece is cut and bent or as a flexible elastic plastic molded part.

On the groove side wall 62, a rib 64 projecting to the inside into the groove 59 is located, which is complementary to the catch groove 57. In the case shown, the cross-sectional design of the rib 64 is approximately in the shape of a partial circle.

Figure 7:
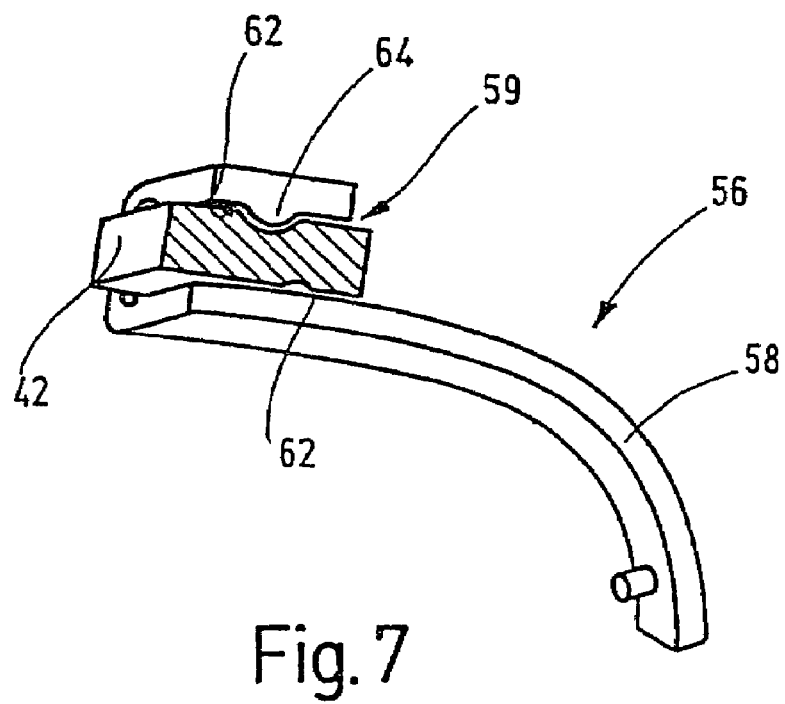
FIGS. 7 and 8 are perspective views showing a retaining device in the form of catch mechanisms for the safety net device according to FIG. 3 in different positions.
Figure 8:
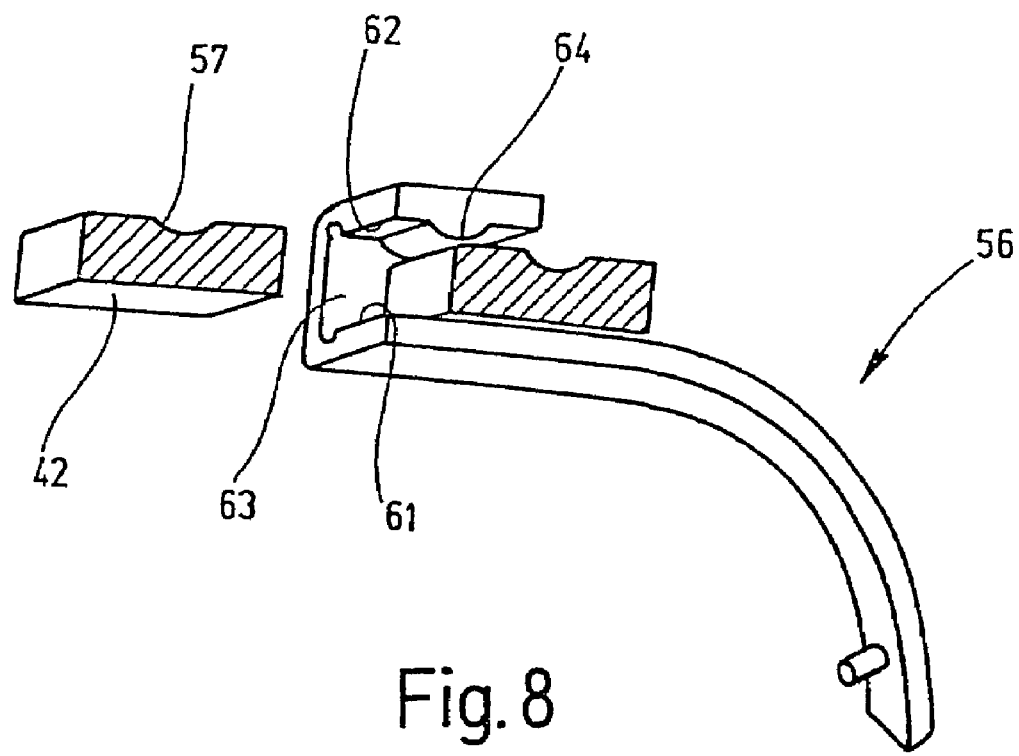

The functional method of the retaining device that does not act in a positive locking manner according to FIGS. 7 and 8 is similar to what was explained previously in relation to FIGS. 3 to 6.

When the safety net 12 is pulled out in the horizontal direction, the stanchion 43 comes into contact with strut 58 of the locationally fixed catch mechanism 56. This catch mechanism stands, prior to engagement, between the strut 58 and the stanchion 43 essentially vertically upright and is bent around the lip 20 through the sliding stanchion 43 in the movement direction of the safety net 12. During further pulling out of the safety net 12, the ends of the stanchions 43 reach into the relevant grooves 59. In this process, the groove 59 expands as soon as the stanchion 43 runs into the rib 64. During a subsequent pull on the safety net 12, the stanchion 43 slides through below the rib 64, continuing until the groove 57 catches with the rib 64. This signals to the user that now a sufficient quantity of safety net 12 has been pulled out, so that as described above, the anchor elements 23, guided through the length of the unwound net 12, can be suspended in the receptacle bays 24. During suspension, the strut 58, starting from the position according to FIG. 8, will be extended again.

Through the corresponding contouring of the rib 64, as well as the catch groove 57 or the small edges of the struts 43, the forces can be controlled, which are necessary, in order to maintain or release the catch of the rib 64 in the catch groove 57. In a functional way, the rib 64 obtains for this an approximately sawtooth-shaped cross-sectional shape, where the more rigid side points away from the winding shaft 13. In this way, it can be achieved that the catch absorbs a part of the pull-back force of the winding shaft 13, in order to, as described above, increase the operating comfort.

If the described intermediate position of the safety net 12 is not needed, but instead the full pull-out length, the user can overcome the catch between the rib 64 and the catch groove 57 with a correspondingly large force, in order to pull the stanchion 43, at the end that faces away from the strut 58, out of the groove 59, as is shown to the left in FIG. 8.

FIG. 9 shows an embodiment of the safety net device 9 in a greatly schematized diagram, where a timing element 71 is allocated to the retaining device 25.

Provided in this embodiment, structural components and other components arise, which have already been described or act or are constructed in a similar manner, these same reference indicators are used, without a further detailed explanation being given.

The retaining device 25 in the embodiment example according to FIGS. 9 to 13 contains in turn a short bar 43 that is connected to the safety net 12 and projects by its end 42 over the edge of the safety net 12 and is attached in the border band 22; it does not project beyond the border band in the direction of the safety net.

This bar 43 forms the movable retaining mechanism of the retaining device 25.

The locationally fixed retaining mechanism of the retaining device 25 consists of a locking lever 72, which is set in bearings so that it can rotate and is parallel to the axis of the winding shaft 13 within the housing 11 on its front side. The locking lever 72 has on one end a drill hole 73. With this drill hole 73, it is inserted on a housing 74 of a viscosity brake, which represents the timing element 71. The viscosity brake involves a commercially available structural component, so that its exact construction must not be explained. Essentially, it consists of a locationally fixed part and the cylindrical housing 74 that can be rotated on it, where between the fixed anchorage part and the housing 74, a gap filled with a high-viscosity liquid is present.

The housing 74 is cylindrical on the outside and transforms on a front side 75 into a single piece molded-on toothed ratchet wheel 76. Acting together with this toothed ratchet wheel 76 is a catch ratchet 77 that is molded so that it is spring-elastic as a single piece on the locking lever 72 in the area of its bearing drill hole 73. The orientation of the teeth of the ratchet wheel 76 as well as the effective direction of the catch ratchet 77 can be gathered from the following functional description.

A catch 78 runs parallel to the locking lever 72 at a distance to it, and forms a type of hook together with the locking lever 72. The end of the locking lever 72 facing away from the bearing drill hole 73 is provided with an eyelet 79 into which a tension spring 81 is suspended, whose other end at 82 is connected to the housing 11.

The effective method of the arrangement described thus far is as follows:

At first it is assumed that the safety net 12 is completely wound up onto the winding shaft 13. In this position, the bar end 43 is located at a radial distance from the axle of the winding shaft 13 corresponding to the roller diameter involved. The locking arm 72 is, due to the effect of the tension spring 81, in the position shown in FIG. 11. In this position, the catch lever 78 appears, extending out from the bearing drill hole 73, approximately in the direction towards the axle of the winding shaft 13.

If, starting from this operating position, the safety net 12 is pulled out of the housing 11 by the pull bar 21, the winding shaft 13 with the roller located on it is set into rotation by the safety net 12. It rotates, relative to FIG. 11, in the counter-clockwise direction.

The length of the catch lever 78 is measured so that its free end 83 is a radial distance from the axle of the winding shaft 13, such that the end 42 of the stanchion can freely pass the end 83 of the catch 78 during the rotation of the winding shaft 13, and to be precise, as long as the stanchion 43 is located on or in the roller of the safety net 12. The locking lever 72 is located with its outer end also outside of the circle of motion that the stanchion 43 located on the roller or in the roller defines.

As soon as the safety net 12 is unwound so far that the stanchion 43 also is released from the outer side of the roller, its end 42 gets into the hook formed between the catch 78 and the locking lever 72. This is achieved by a corresponding position of the lip 20 relative to the catch lever 78.

When the stanchion end 43 becomes suspended behind the catch lever 78, the additional pulling out of the safety net 12 from the housing leads to the catch lever 78 being rotated together with the locking lever 72 out of the position shown in FIG. 11, into the position shown in FIG. 12. In this process, these two levers 72 and 78 rotate with the bearing drill hole 73 on the cylindrical outer surface of the housing 74 of the viscosity brake 71.

The free-wheel formed from the ratchet wheel 76 and the catch ratchet 77 is designed so that in a pivoting of the locking lever 72 in the clockwise direction, i.e. out of the position according to FIG. 11 into the position according to FIG. 12, no obstruction results through the viscosity brake 71 when the safety net 12 is pulled out.

At the same time as the pivoting of the locking lever 72, the tension spring 81 is also tensioned.

When the position according to FIG. 12 is reached, the locking lever 72 is recognizable in the movement path of the stanchion end 43. In this position, so much of the safety net 12 has been pulled off of the winding shaft 13, that the user can suspend the anchor elements 23 free from tension in the receptacle bays 24. When the user relaxes the safety net 12 in this position, the pull-back force applied by the spring motor 14 is absorbed by the locking lever 72, on which the strut end 42 rests. The locking lever 72 is coupled onto the viscosity brake via the combined action of the catch ratchet 77. The viscosity brake is only to be rotated back slowly, so that the return movement of the locking lever 72 into the release position is greatly slowed.

Since the brake 71 is a viscosity brake, it does not act as a blocking component, but instead as a delay component, which makes possible a slow rotation by a torque that acts from outside. The viscosity brake 71 will consequently not block a return rotation of the locking lever 72 into the position according to FIG. 11, but instead only slow it. The locking lever 72 will in the end go back into the position according to FIG. 11 under the action of the tension spring 81. Thus, the winding shaft 13 can stretch the safety net 12 tight without obstruction through the locking lever 72, in which the stanchion end 43 has been caught.

When the user wants to completely allow the safety net 12 to retract, he completely unfastens the anchor elements 23 from the receptacle bays 24 and allows the pull bar 21 to run back in the direction to the slit 18. Thus, the stanchion end 43 slides over the rear side of the catch lever 78 that has in the meantime swung down, and it reaches the outside of the roller made of the safety net 12 that is wound up such that the stanchion end 43 is released from the effective area of the catch 78.

From the explanation given above it results that the user has a limited time available for suspending the anchor elements 23. This time is measured from the delay time which the locking lever 72 requires until it has rotated back under the action of the forces acting on it in the direction to the position according to FIG. 11 where it no longer prevents a pulling back of the safety net 12. This delay time is a function of the characteristic of the viscosity brake 71 and the force acting on the catch lever 72, which is comprised of the pull-back force of the safety net 12 and the force of the spring 81.

FIGS. 14 to 18 show an embodiment of a safety net device 9, in which the retaining device 25 acts between the housing and the winding shaft 13.

Also in this embodiment, the same reference indicators are used for structural components and other components that have already been described, without a new detailed functional description being given. Moreover, the diagram is limited to the components necessary for the understanding of the invention.

The retaining device 25 consists of a stationary retaining mechanism 85 and a follower component 86 connected to the winding shaft 13.

The stationary retaining mechanism 85, which is not attached in the housing, has the design of a container with a cylindrical collar 87 that is to be adapted to the winding shaft 13 and that extends out from a bottom 88. A drill hole 89 for a bearing journal 91 of the winding shaft 13 leads concentrically through the bottom 88. Within the cylindrical collar 87, a wall 92 runs in a spiral shape, which begins at 93 and ends radially further inside at 94. This radially internal end 94 is located at a clear radial distance from the drill hole 89.

Figure 14:
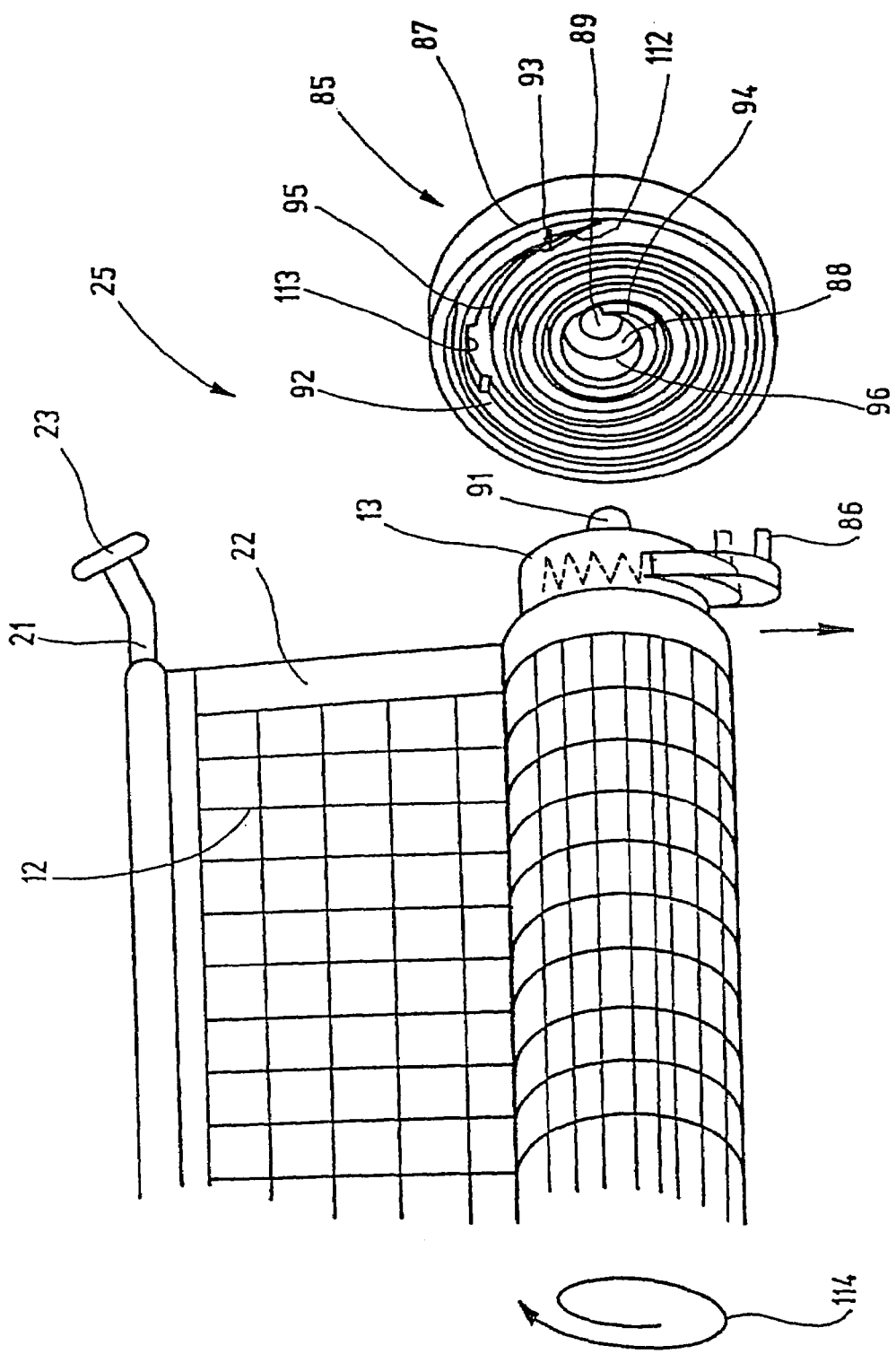
FIG. 14 is a perspective view showing a safety net device, in which the retaining device acts together with the winding shaft with the housing omitted.
Figure 15:
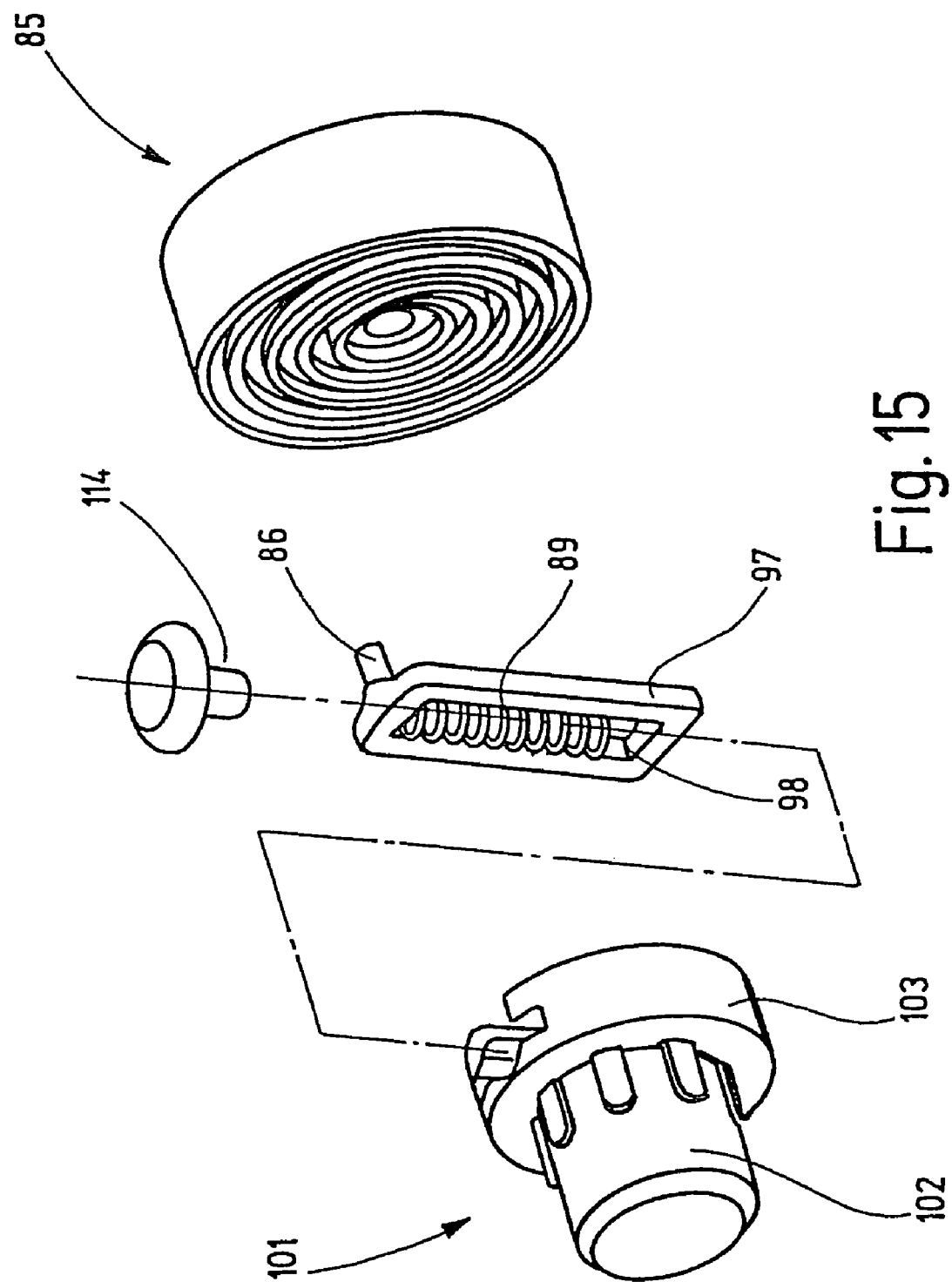
FIG. 15 is an exploded perspective view showing the follower connected to the winding shaft.

As best shown in FIG. 14, because of the progression of the spiral wall 92, a groove extending in a circular pattern occurs in the immediate proximity to the cylindrical inner wall of the collar 87 defined by the inner wall of the collar and the radially outermost winding of the spiral wall, while between the adjacent windings of the wall 92, a groove 95 that extends in a spiral results.

This groove 95 changes radially on the inside into an essentially cylindrical area 96, which is concentric to the drill hole 89.

The follower component 86, which has the shape of a cylindrical journal, is seated on a slide 97. This slide 97 contains a longitudinal hole 98 that is closed on all sides and is continuous over its entire length, in which a screw compression spring 99 is housed.

An end piece 101 that is T-shaped in cross-section is plugged into a tube that forms the winding shaft 13 and is anchored in the winding shaft 13 so that it can rotate. This endpiece 101 carries a journal 102 that projects into the winding shaft 13 and transforms into a cylindrical flange 103 outside of the winding shaft 13. The flange 103 has a front side 104 that faces away from the winding shaft 13, onto which the bearing journal 91 is molded as a single piece, which is set in bearings in the bearing drill hole 89 so that it can rotate.

In the flange 103, a hole passing through 105 is located, running through the diameter of the flange 103, and emerging to the outside at 106 through the circumferential surface of the flange 103. The cross-section of the pass-through hole 105 corresponds to the cross-section of the slide 97, so that the slide 97 is guided in the pass-through hole 105 so that it can move longitudinally and cannot rotate. In addition, the flange 103 contains a slit 107 that, starting from the bearing journal 91, extends up to the circumferential side, i.e. the opening 106 of the pass-through hole 105. It is aligned with the pass-through hole 105 and functions as a penetration opening for the follower component 86, when the slide 97 slides more or less deeply into the pass-through hole 105.

In order to receive the compression spring 99, the cross-section of the pass-through hole 105 is expanded cylindrically in the center, such that the cylindrical expansion 109 ends at one end 111 prior to the circumferential surface of the flange 103.

Depending on the rotational direction, the follower component 86 either slides along in the circular shaped running groove defined by the cylindrical inner wall of the collar 87 and the radially outer most winding of the spiral wall 92 or is guided back into the spiral running groove 95 by a spring component 112. The spring component 112 functions as a distributing mechanism or switch by directing the follower 86 either around the circular inner wall of the collar 87 or into the spiral groove 95 depending on the direction of travel of the follower (i.e., clockwise or counterclockwise). The spring component 112 is provided on the radially outer-lying end of the wall 92. In the resting position, the leaf spring tongue 112 rests on the cylindrical inside of the collar 87.

Finally, a catch recess 113 is provided in the spiral running wall 92.

The functional method of the retaining device according to FIGS. 14 to 18 is as follows, where from the functional description, the winding direction of the spiral groove 95 also can be gathered:

When the safety net 12 is completely driven in, the follower component 86 is located within the approximately cylindrical section 96, as is limited by the radially inner lying end area of the wall 92. In this position, the slide 97 is pressed in at maximum depth, i.e. the follower component 86 is located in practically immediate proximity to the bearing journal 91.

If, starting from this position, the user would like to pull the safety net 12 out, in order to suspend it in the receptacle bays 24, the winding shaft 13 is set into rotation, as is indicated by the spiral arrow 119. In this turning, the follower component 86 runs into the spiral groove 95 on its end that lies radially to the inside in the area of the end 94 of the spiral wall 92. This running in is achieved by the follower component 86 being pretensioned radially to the outside away from the bearing journal 91 as a result of the screw compression spring 99.

As soon as it has run into the spiral groove 95, it is forcibly guided radially between the walls of the spiral groove 95. After a corresponding number of revolutions or partial rotations of the winding shaft 13, the follower component 86 gets into the catch recess 113. The position of the catch recess 113 corresponds in the case presented here to approx. 2¾ revolutions of the winding shaft 13. This in turn corresponds to a pull-out length on the safety net 12, which allows a hassle-free suspending of the anchor elements 23 into the receptacle bays 24, when the short pull-out length is necessary.

Since the catch recess 113 is provided with rigid sides, the follower component 86 catches in the catch recess 113. When the user lets go of the pull bar 21 after the catching, the follower component 86 is set on the relevant wall in the circumferential direction of the catch recess 113. In this way, a catch force results in combination with the compression spring 99, which can not be overcome by the pull back force of the angular spring 14. The user can now suspend the anchor elements 23 in the receptacle bays 24 without exerting force. As soon as this has occurred, he activates a release button 114 that is present on the housing, which is located at a position corresponding to the position of the slide 97 during catching in the catch recess 113. By pressing down the activation button 114, which acts on the respective end of the slide 97, on which the follower component 86 is located, the follower component 86 is pressed out of the catch recess 113 against the action of the compression spring 99, so that now the angular spring 14 can tension the safety net 12. After the tensioning of the safety net 12, the follower component 86 is located is between the catch recess 113 and the radially inner end 94 of the side wall 92, (see FIG. 14).

Without further activation of the release button 114, the user can run the safety net 12 back into the housing 11, such that the follower component 86 is conducted radially in the direction towards the bearing journal 91 as a result of the spiral groove 95 with each rotation of the winding shaft 13.

Figure 17:
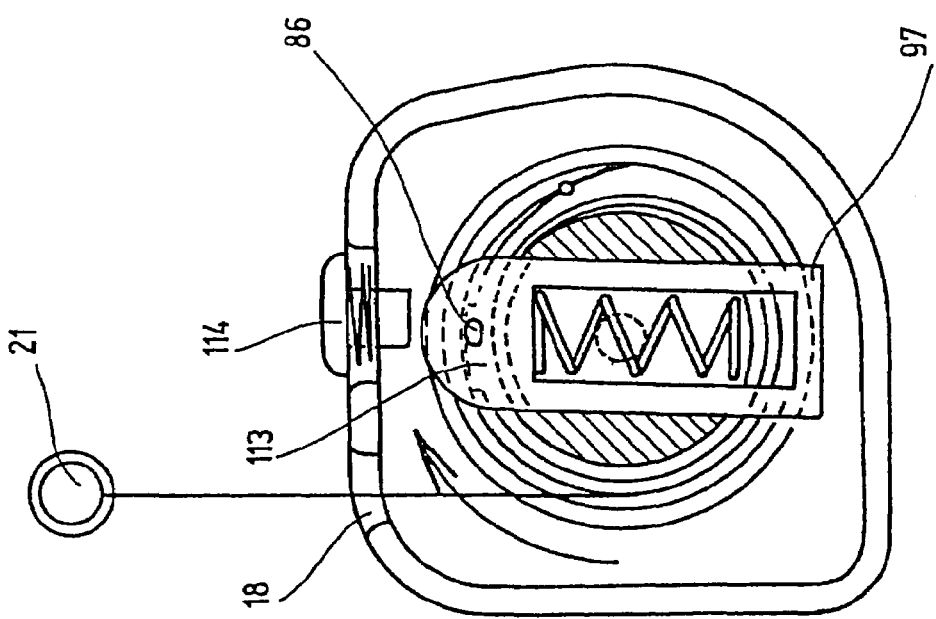
FIG. 17 shows the retaining device of the embodiment example according to FIG. 14, in the retaining position and in a section at a right angle to the axle of the winding shaft.

If the user requires a larger quantity of safety net 12, for example, because the housing 11 is located in proximity to the luggage compartment floor, it first goes back into its functional position, in which the follower component 86 catches in the catch recess 113, when the safety net 12 is pulled out. This position is shown in FIGS. 16 and 17. By pressing down the release button 114, the follower component 86 is lifted out of the catch recess 113 and the user can now pull the safety net 12 further out unobstructed by the catch recess 113. In the further movement, the follower component 86 moves past and over the leaf spring tongue 112 that functions as a distributing mechanism, and then engages the cylindrical inner wall of the collar 87. After each complete rotation, the follower component 86 runs over the leaf spring tongue 112 which presses the free end of the follower component 86 away from the cylindrical inner surface of the collar 97. The cam follower component passes the spring tongue 112 in this way unobstructed and correspondingly often.

Figure 18:
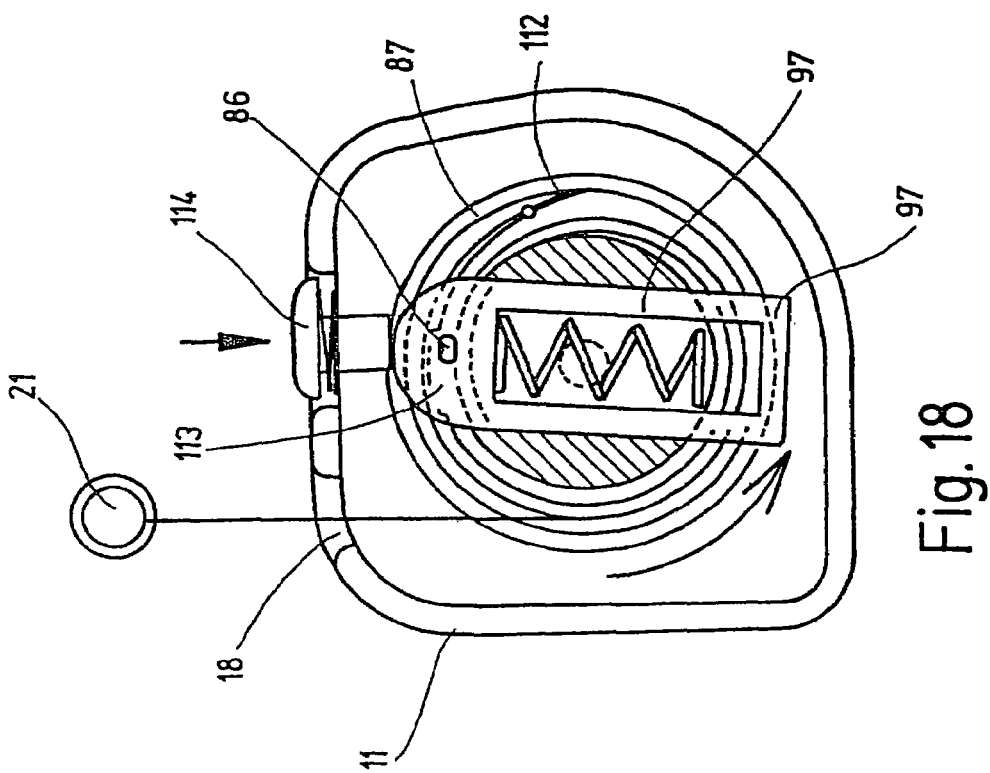
FIG. 18 shows the arrangement according to FIG. 17, in another operating position.

For removal, the user guides the pull bar 21 back in the direction to the slit 18. After at most one almost complete revolution, the follower component 86 moves past the leaf spring tongue 112 resting on the inside of the collar 87 and is threaded back into the radial outer lying beginning of the groove 95. After an additional revolution of approx. 90° in the embodiment depicted, the follower component 86 in turn gets into the catch recess 113, out of which it must be lifted in order to drive the safety net 12 further in using the release button 114. The lifted position is shown in FIG. 18.

From now on, the follower component 86 runs in the circumferential passages of the spiral groove 95 lying further inside to its inside end corresponding to the end 94 of the wall 92.

Regardless of how much safety net 12 is located outside of the housing and must be wound on the winding shaft 13, the follower component 86 rotates in the free-wheel direction in the almost cylindrical area 96, without bringing about an obstruction of the wind-up movement.

The advantage of this arrangement is that the number of windings in the spiral groove can be configured such that less windings of the groove are necessary, than the number of revolutions of the winding shaft 13 that are required to completely pull-out the safety net.

As is apparent from the above description, the spiral groove 95 acts together with the catch recess 113 as a type of counter, which records the revolutions of the winding shaft 13 in order to determine how many complete revolutions plus partial revolutions are made for a pull-out length on the safety net 12, so that the safety net 12 can be suspended without difficulties in the receptacle bays 24.

FIGS. 19 to 23 show in a greatly schematized basic representation, a retaining device 25, which acts together directly with the winding shaft 13 and is triggered by an acceleration-dependent device 121. The safety net 12 is connected by an edge to the winding shaft 13 is, as previously, where its other edge is attached to the pull bar 21.

As a locationally fixed retaining component, a locking ratchet wheel 122 functions, which carries saw-tooth shaped teeth in a known way and is coupled to the winding shaft 13 in a rotationally fixed manner. The movable retaining component is represented by a locking ratchet slide 123.

In detail, the structure is as follows:

In a schematically indicated housing 124, the locking ratchet slide 123 is set in bearings so that it can move in a corresponding guide, so that it can be moved on the locking ratchet wheel 122 radially toward and away from it. The locking ratchet slide 123 has on its upper side a first catch 125 and on its rear end, a second catch 125. The two catches 125, 125 are extensions or arms that are set off at right angles from the slide 123.

Somewhat below the catch 125, a compression spring 127 meshes in a drill hole 126, the other end of which is anchored at 128 in the housing. The position of the anchor point 128 is selected so that the compression spring 127 can act as a catch spring for the locking ratchet slide 123.

Above the locking ratchet slide 123, a sensing slide 129 is located, which is guided in the direction parallel to the locking ratchet slide 123 in the housing 124. The sensing slide 129 acts via a slope surface 131 on its left end together with the pull bar 21. It pretensions a position, via a tension spring 132 that meshes at the rear end of the sensing slide 129 and finds its abutment in the housing 124, in which the slope surface 131 of a stopper surface 133 fixed to the housing is as closely adjacent as possible. In this position, an arm 134 that extends to the bottom from the sensing slide 129 lies on a housing wall 135. The length of the arm 134 is measured so that the open end of the arm 134 can come into contact with the catch 124.

In an inner space 136 of the housing 124, in which the catch 125 also moves, a hook-shaped catch slide 137 is set in bearings so that it can move. The catch 137 has an arm 138 that points to the top, which is provided so that it can come into mesh with the catch 125.

In the movement direction behind the catch slide 137, a weight 139, which is guided in a chamber 138 of the housing 124, is located, which is pretensioned by a compression spring 141 in the direction towards the winding shaft 13.

The kinematic connection between the weight 139 and the catch slide 137 is created by a coupling spring 142 that is attached on the end of the catch slide 137 that faces away from the arm 138 and towards an arm 143, which extends out from the mass 139 and projects in the direction towards the catch slide 137.

Figure 19:
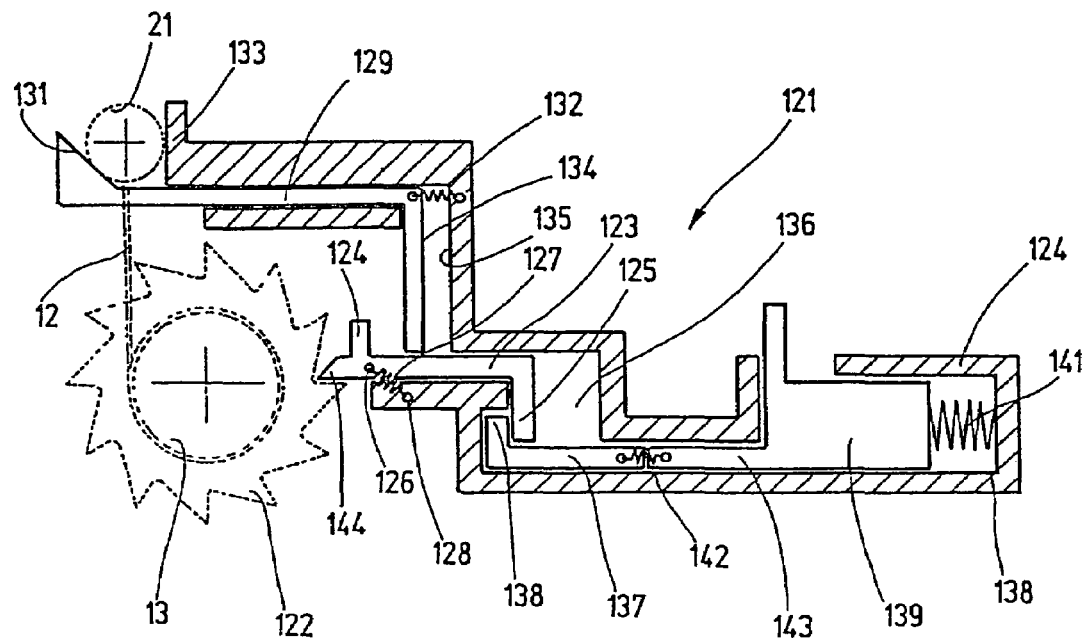
FIG. 19 to FIG. 23 show a retaining device in combination with a triggering device that functions depending on acceleration.

The device according to FIG. 19 operates as follows:

At first, an operating position is assumed, as shown in FIG. 19. The safety net 12 is completely wound around the winding shaft 13, so that the pull bar 21 penetrates into the wedge-shaped space between the slope surface 131 and the housing stopper surface 133. In this way, the sensing slide 129 is moved in its end position directed towards left, in which the pull spring 132 is tensioned to the maximum extent. At the same time, the compression spring 127 is snapped in the direction towards the winding shaft 13 and presses a catch projection 144 of the locking ratchet slide 123 into the teeth gaps of the locking ratchet wheel 122.

The weight 139 is also brought via the compression spring 141 into the left end position.

Figure 20:
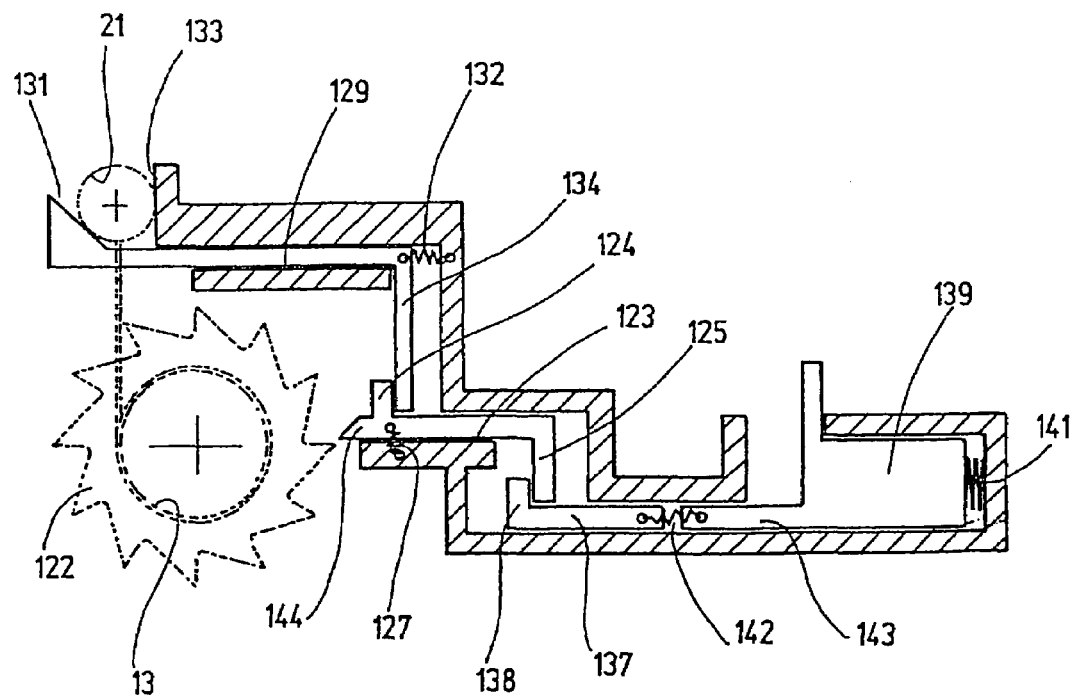
Figure 21:
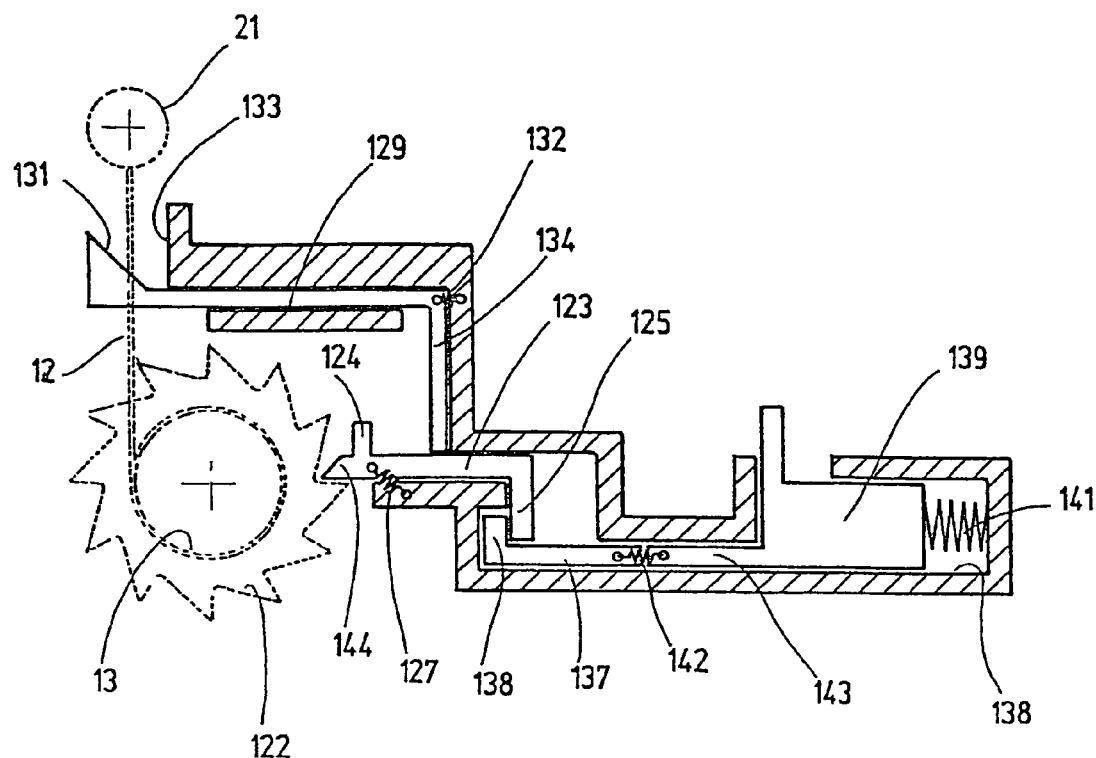

When the vehicle equipped with this device begins to move towards the left relative to the representations, the inertia of the weight 139 causes it to move against the action of the compression spring 141 into the chamber 138 into the right end position, as is shown in FIG. 20. In this way, the catch slide 137 is also pulled via the coupling spring 142 to the right relative to the housing 124. This movement directed towards the right is transferred from the arm 138 to the arm 125, such that the locking ratchet slide 123 is also bent back to the extent until its catch 124 comes to rest on the arm 134. This arm 134 can not move out of the left end position, since the pull bar 21 is clamped between the slope surface 131 and the stopper surface 133. The sensing slide 129 will thus maintain its left end position, which is why the locking ratchet slide 123 can only be pulled back into the position corresponding to FIG. 20. This slide of the locking ratchet slide 123 directed towards the right is not sufficient to allow the compression spring 127 to reverse. When the acceleration force disappears, the locking ratchet slide 123 will as a result move back into the position according to FIG. 19, when the force that pulls it back, which is exerted by the catch slide 137, stops acting upon it.

The user can grasp the pull bar 21 in order to deploy the safety net 12 and move it to the top in the direction towards the receptacle bays 24. In this way, the sensing slide 129 comes free and can get into its right end position as a result of the action of the tension spring 132, see FIG. 21. At the same time, through the pulling out of the safety net 12, the winding shaft 13 is set into rotation in the clockwise direction. In this way, the flat tooth sides of the locking ratchet wheel 122 ratchet past the locking projection 144 of the locking ratchet slide 123 and press it periodically to the right against the action of the compression spring 127. Since the shift does not exceed the transition point of the compression spring 127, the locking ratchet slide 123 in each tooth gap jumps back to the left in the tooth gaps.

When the user has pulled out sufficient safety net and the tension in the safety net subsides, the spring motor 14 acts to move the winding shaft 13 back in the direction of the wind up. It is however, prevented in this by the combined action of the locking ratchet wheel 122 with the locking projection 144, since the rigid tooth side surfaces rest on the locking projection 144 and can not press them back, see FIG. 21.

The user is now in a position to suspend the anchor elements 23 in the receptacle bays 24 without applying force.

Figure 22:
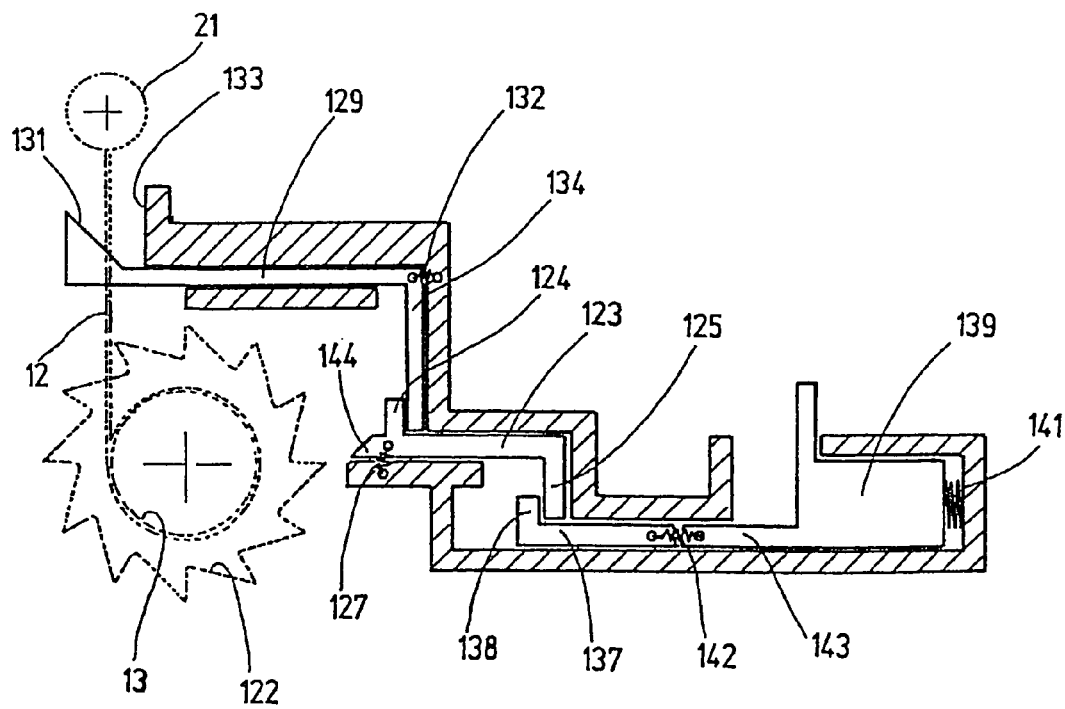
Figure 23:
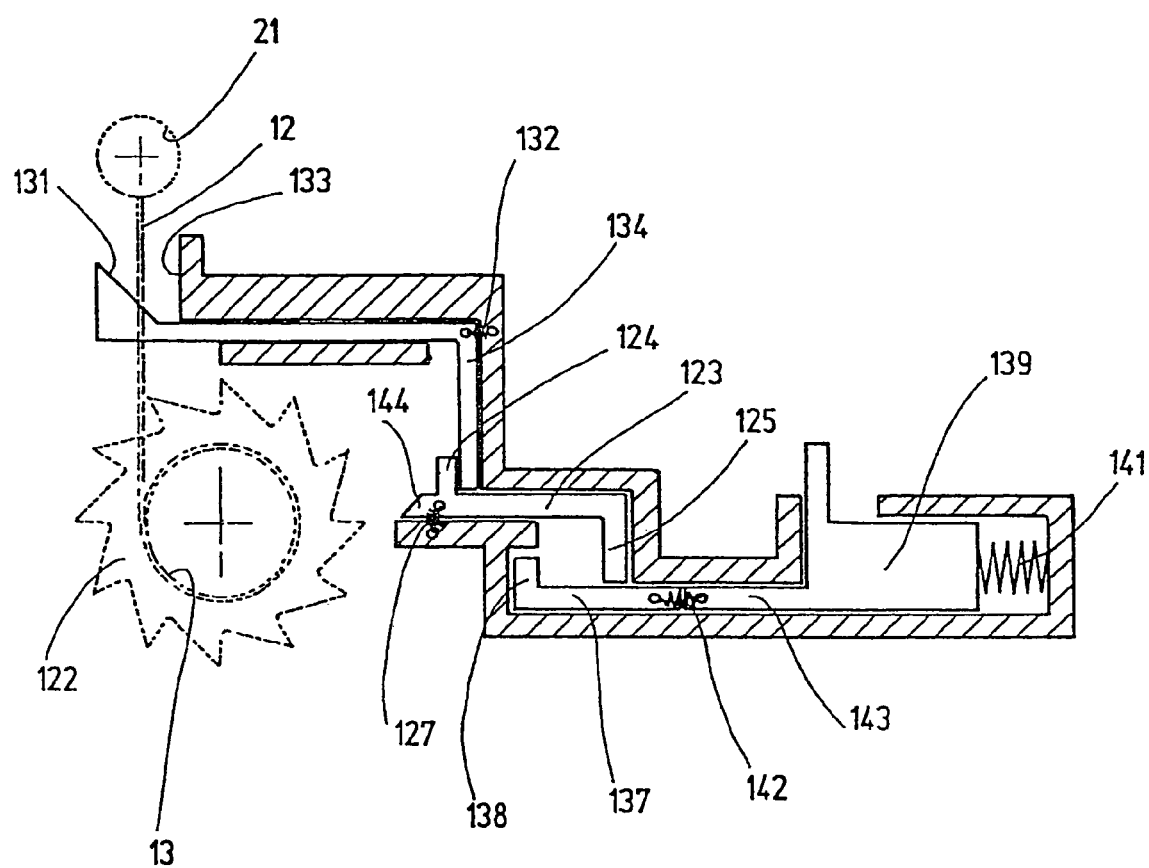

If after suspending the safety net 12, the vehicle is driven for the first time, the operation explained above repeats. The inertia of the weight 139 shifts the mass 139 to the right relative to the housing 124 against the action of the compression spring 131, as shown in FIG. 22. This movement will in turn transfer via the coupling spring 142 to the catch slide 137, which pulls the locking ratchet slide 123 to the right for the combined action of the arm 138 with the arm 125. Since, however, this time the sensing slide 129 is located in its right end position, the movement of the locking ratchet slide 123 is not stopped as described above, but instead can continue further to the right, where the reversal point of the compression spring 127 is exceeded. After this point is exceeded, the compression spring 127 no longer acts to the left in the direction towards the locking ratchet wheel 122, but instead to the right in the sense that it holds the locking ratchet slide 123 out of mesh with the locking ratchet wheel 122, even if the weight 139 is then returned into the position according to FIG. 23. The force applied by the spring motor 14 is thus free and can set the winding shaft 13 into rotation in the direction of winding up and thus tensioning of the safety net 12.

If the user wants to retract the safety net, it is sufficient to allow the pull bar 21 to be dismounted and the safety net 12 to run back. On the end of the drive-in movement, the pull bar 21 again comes into the wedge-shaped space between the sloped surface 131 and the stopper 133 and presses the sensing slide 129 back into its left end position. In this movement, the sensing slide 129 carries with it the locking ratchet slide 123 to the left over the reversal point of the compression spring 127, so that the starting position is achieved according to FIG. 19.

A safety net device has a housing, in which a winding shaft is set in bearings so that it can rotate. Using a spring motor, the winding shaft is pretensioned in the wind-up direction of a safety net attached to the winding shaft. The other edge of the safety net is connected to a pull bar, which is to be suspended in the receptacle bays in the car body.

So that the suspension can be done by the user with as little force as possible, a retaining device is provided, which absorbs at least a part of the pull-back force occurring when the safety net is run back into the housing, as soon as the safety net has been pulled out of the housing far enough until the pull bar can be suspended in the receptacle bays. The retaining device can be voluntarily unlocked in order to again make possible stowage of the safety net in the housing.

All references, including publications, patent applications, and patents, cited herein are hereby incorporated by reference to the same extent as if each reference were individually and specifically indicated to be incorporated by reference and were set forth in its entirety herein.

What is claimed is:

1. A safety net device for a motor vehicle operable to prevent objects from being thrown out of a luggage compartment or trunk of the vehicle and into the passenger compartment of the vehicle during a rear-end collision, the safety net device comprising in combination:
    a housing having an outlet slit extending parallel to a length of the housing,
    a winding shaft that is set in bearings in the housing so that the winding shaft can rotate,
    a safety net that has two longitudinal edges set off at a distance from each other, one of the longitudinal edges being attached to the winding shaft and the other of the edges being connected to a pull bar, wherein the safety net extends through the outlet slit, and is operable to be brought by a user into at least one pull-out position in which the safety net is pulled out of the housing to a predetermined pull-out length,
    a drive device operable on the winding shaft in order to pretension the winding shaft in a wind-up direction of the safety net so as to generate a pull-back force on the safety net,
    receptacle bays mounted in the vehicle for the pull bar,
    at least one retaining device oriented so as to be operable at the pull-out position of the safety net with the pull bar disengaged from the receptacle bays to absorb at least a part of the pull-back force of the drive device and wherein the at least one retaining device acts on the pull bar.

2. The safety net device according to claim 1 wherein the retaining device is configured such that it completely absorbs the pull-back force.

3. The safety net device according to claim 1, wherein the retaining device has at least one spacer, which is attached on the one end to the housing, and on the other end, to the pull bar.

4. The safety net device according to claim 3, wherein the spacer is coupled to the housing and is movable around the axles, one pivot axle being parallel to the axle of the winding shaft and another pivot axle being perpendicular to the axle of the winding shaft.

5. The safety net device according to claim 3, wherein the pull bar includes a slide guide within which the end of the spacer that faces away from the housing is conducted.

6. The safety net device according to claim 3, wherein the pull bar is provided with a voluntarily detachable catch device operable in first and second states, wherein the first state the spacer can freely pass the catch device in its two movement directions in the pull bar, and in the second state, the spacer can only pass the catch device in one movement direction such that by action of the spacer on the catch device, the pull bar is held at a distance from the housing.

7. The safety net device according to claim 3, wherein two equivalent, opposing pivoting spacers are provided.

* * * * *